(12) United States Patent
Ukita et al.

(10) Patent No.: US 11,926,278 B2
(45) Date of Patent: Mar. 12, 2024

(54) AIRBAG DEVICE AND VEHICLE SEAT

(71) Applicant: DAICEL CORPORATION, Osaka (JP)

(72) Inventors: Shinichiro Ukita, Tokyo (JP); Tomoki Hashizume, Tokyo (JP); Kenji Fukumoto, Tokyo (JP); Masayuki Yamazaki, Tokyo (JP); Nobuyuki Katsuda, Tokyo (JP)

(73) Assignee: DAICEL CORPORATION, Tokyo (JP)

( * ) Notice: Subject to any disclaimer, the term of this patent is extended or adjusted under 35 U.S.C. 154(b) by 43 days.

(21) Appl. No.: 17/778,117

(22) PCT Filed: Oct. 12, 2020

(86) PCT No.: PCT/JP2020/038494
§ 371 (c)(1),
(2) Date: May 19, 2022

(87) PCT Pub. No.: WO2021/100355
PCT Pub. Date: May 27, 2021

(65) Prior Publication Data
US 2022/0410833 A1   Dec. 29, 2022

(30) Foreign Application Priority Data

Nov. 22, 2019   (JP) ................................ 2019-211819

(51) Int. Cl.
*B60R 21/207*   (2006.01)
*B60R 21/231*   (2011.01)
(Continued)

(52) U.S. Cl.
CPC ...... *B60R 21/207* (2013.01); *B60R 21/23138* (2013.01); *B60R 21/233* (2013.01); *B60R 21/261* (2013.01); *B60R 2021/23146* (2013.01)

(58) Field of Classification Search
CPC ............ B60R 21/207; B60R 21/23138; B60R 21/233; B60R 21/261; B60R 2021/23146
See application file for complete search history.

(56) References Cited

U.S. PATENT DOCUMENTS 5,779,263 A * 7/1998 Lane, Jr. ............... B60R 21/201
                                                          280/730.2
5,913,536 A * 6/1999 Brown ............. B60R 21/23138
                                                          280/730.2
(Continued)

FOREIGN PATENT DOCUMENTS

CN   101213115 A   7/2008
DE   29820348 U1   2/1999
(Continued)

OTHER PUBLICATIONS

International Search Report dated Nov. 10, 2020, issued in counterpart International application No. PCT/JP2020/038494, with English translation. (7 pages).

(Continued)

*Primary Examiner* — Toan C To
(74) *Attorney, Agent, or Firm* — WHDA, LLP

(57) ABSTRACT

An airbag device includes a seat frame that forms a skeleton of a vehicle seat on which an occupant of a vehicle sits; an airbag that is disposed on a backrest portion that supports a back of the occupant in the vehicle seat and that is deployed by supply of gas; and a gas generator that is disposed at a seating surface portion that supports buttocks of the occupant in the vehicle seat and that generates gas to be supplied to the airbag; where a part that is a portion of the seat frame and includes at least a portion of a back frame forming a skeleton of the backrest portion, is formed as a flow tube that connects to the airbag to supply gas generated by the gas generator to the airbag.

22 Claims, 14 Drawing Sheets

(51) Int. Cl.
*B60R 21/233* (2006.01)
*B60R 21/261* (2011.01)

(56) References Cited

U.S. PATENT DOCUMENTS

| | | | |
|---|---|---|---|
| 6,425,602 | B1 | 7/2002 | Al-Amin et al. |
| 7,328,945 | B2 * | 2/2008 | Yoshikawa ........ B60N 2/42718 |
| | | | 297/216.1 |
| 7,871,105 | B2 * | 1/2011 | Itoga .................... B60R 21/26 |
| | | | 280/733 |
| 9,707,870 | B2 * | 7/2017 | Line ....................... B60N 2/643 |
| 10,829,077 | B2 * | 11/2020 | Veggian ................ B60R 21/207 |
| 11,180,102 | B1 * | 11/2021 | Jaradi ................. B60R 21/2338 |
| 2004/0075254 | A1 | 4/2004 | Honda |
| 2009/0160168 | A1 | 6/2009 | Itoga |
| 2020/0062207 | A1 * | 2/2020 | Kobayashi ............ B60R 21/207 |
| 2022/0379833 | A1 * | 12/2022 | Shimizu ............. B60R 21/2338 |
| 2023/0069779 | A1 * | 3/2023 | Shimizu ................ B60R 21/233 |
| 2023/0242061 | A1 * | 8/2023 | Shimizu ................ B60R 21/201 |
| | | | 280/730.2 |

FOREIGN PATENT DOCUMENTS

| | | |
|---|---|---|
| JP | H03-108564 U | 11/1991 |
| JP | 2003-285709 A | 10/2003 |
| JP | 2004-090906 A | 3/2004 |
| JP | 2007-098991 A | 4/2007 |
| JP | 2008-201298 A | 9/2008 |
| JP | 2013-133079 A | 7/2013 |
| JP | 2018-090224 A | 6/2018 |

OTHER PUBLICATIONS

Written Opinion dated Nov. 10, 2020, issued in counterpart International application No. PCT/JP2020/038494, with English translation. (8 pages).

Office Action dated Nov. 15, 2023, issued in counterpart CN application No. 202080080772.4 with English machine translation. (9 pages).

* cited by examiner

AIRBAG DEVICE AND VEHICLE SEAT

TECHNICAL FIELD

The present invention relates to an airbag device and a vehicle seat equipped with an airbag device.

BACKGROUND ART

As an airbag device mounted in a vehicle such as an automobile, a side (side collision protection) airbag device that restrains and protects an occupant at the time of side collision is known. The side airbag device is typically disposed on a backrest portion (seat back) of a vehicle seat, and is configured to expand and deploy the airbag by supplying working gas from a gas generator (inflator) to the airbag.

However, in a structure in which the airbag device is disposed in the backrest portion, it was difficult to thin the backrest portion. In relation thereto, a technology for disposing an airbag in the backrest portion, disposing a gas generator in a reclining rod that serves as a rotating shaft when the backrest portion is reclined, and connecting a gas generator and an airbag by a conduit, in the side airbag device, is known (see, for example, Patent Document 1).

CITATION LIST

Patent Document

Patent Document 1: JP 2008-201298 A
Patent Document 2: JP 2013-133079 A

SUMMARY OF INVENTION

Technical Problem

However, since the airbag device disclosed in Patent Document 1 has a structure in which a gas generator is disposed in a hollow-shaped reclining rod, it is conceived that the degree of freedom of design, for example, the position, or the range in which the gas generator is disposed is low. In addition, since a structure in which the gas generator and the airbag are directly connected by a small conduit having a relatively small cross-sectional area is adopted, it takes time to supply the gas from the gas generator to the airbag and it may be difficult to rapidly inflate and deploy the airbag.

The technology of the present disclosure is made in view of the above-described circumstances, and an object of the present disclosure is to provide an airbag device capable of thinning the backrest portion of a vehicle seat and inflating and deploying the airbag more rapidly.

Solution to Problem

To solve the above problems, the technology of the present disclosure employs the following configuration. That is, the technology of the present disclosure is an airbag device including a seat frame that forms a skeleton of a vehicle seat on which an occupant of a vehicle sits; an airbag that is disposed on a backrest portion that supports a back of the occupant in the vehicle seat and that is deployed by supply of gas; and a gas generator that is disposed at a seating surface portion that supports buttocks of the occupant in the vehicle seat and that generates gas to be supplied to the airbag; where a part that is a portion of the seat frame and includes at least a portion of a back frame forming a skeleton of the backrest portion, is formed as a flow tube that connects to the airbag to supply gas generated by the gas generator to the airbag.

According to the airbag device of the present disclosure, the backrest portion can be thinned as compared with a known airbag device in which the airbag and the gas generator are both disposed at the backrest portion by adopting a structure in which the gas generator is not disposed at the backrest portion of the vehicle seat. Here, the seat frame for forming the skeleton of the vehicle seat typically has a sufficient thickness (cross-sectional area) to ensure the strength necessary for the structure. The airbag device according to the present disclosure can ensure a large cross-sectional area of the gas flow path in a flow tube by forming a part that is a portion of the seat frame and includes at least a portion of the back frame, as the flow tube. This makes it possible to reduce the ventilation resistance and increase the flow rate and flow speed of the gas flowing through the flow tube. As a result, gas can be quickly supplied to the airbag, and the airbag can be rapidly deployed.

Additionally, the airbag device of the present disclosure may further include a conduit that guides the gas from the gas generator to the flow tube, where the conduit may be connected to a part closer to the seating surface portion than a part where the airbag is connected in the flow tube.

Thus, the conduit is connected to a part closer to the seating surface portion where the gas generator is disposed than the part where the airbag is connected, in the flow tube. Therefore, the distance between the gas generator and the part where the conduit is connected in the flow tube can be shortened. This allows the length of the conduit to be shortened. As a result, the gas can be guided to the flow tube at an early stage, and the gas can be quickly supplied to the airbag. As a result, the airbag can be deployed more rapidly. In addition, since the length of the conduit is shortened, the handling of the conduit in the seat is facilitated, and the entanglement of the conduit and the like can be suppressed. Furthermore, it is possible to reduce the material cost and the weight of the seat itself.

Additionally, in an airbag device including the conduit, the seat frame may include a rotating shaft portion that forms a rotating shaft of the back frame for reclining the backrest portion, a part that is a portion of the seat frame and includes at least a portion of the back frame and at least a portion of the rotating shaft portion, may be formed as the flow tube, and the conduit may be connected to at least a portion of the rotating shaft portion in the flow tube.

In this way, the conduit connects the gas generator disposed at the seating surface portion and the rotating shaft portion serving as the axis of rotation relative to the seating surface portion of the back frame. Therefore, the distance between the gas generator and the part where the conduit is connected in the flow tube can be shortened. This allows the length of the conduit to be shortened. As a result, the gas can be guided to the flow tube at an early stage, and the gas can be quickly supplied to the airbag. As a result, the airbag can be deployed more rapidly.

In the airbag device of the present disclosure, the cross-sectional area of the gas flow path in the flow tube may be set to be greater than the cross-sectional area of the flow path in the conduit.

Thus, the flow rate and the flow speed of the gas in the flow tube can be made greater than the flow rate and the flow speed of the gas in the conduit. As a result, gas can be supplied to the airbag more quickly, and the airbag can be deployed more rapidly. Note that the cross-sectional area here refers to an area of a cross-section orthogonal to the direction in which the gas flows.

Additionally, in the airbag device of the present disclosure, the airbag includes a first inflating portion that protects the chest of the occupant by being inflated by the supply of gas, and a second inflating portion that protects the waist of the occupant by being inflated by the supply of the gas, and in the flow tube, a second supply port that supplies the gas to the second inflating portion may be formed at a part upstream, along the flow of the gas, of a first supply port that supplies the gas to the first inflating portion.

Thus, when the gas generated by the gas generator flows through the flow tube, the supply of gas to the second inflating portion is started earlier than the supply of gas to the first inflating portion. As a result, the second inflating portion can be inflated earlier than the first inflating portion. When such an airbag device is operated, the second inflating portion is inflated first, thereby restraining the waist of the occupant. The first inflating portion is then inflated to restrain the chest of the occupant. By restraining the waist and the chest, of the body of the occupant, in this order, the shake of the body of the occupant can be suitably suppressed at the time of vehicle collision, and the occupant can be more suitably protected.

In the airbag device of the present disclosure, the airbag may be a torso airbag that protects the chest of the occupant by being deployed by the supply of gas, the airbag device may further include a pelvis airbag that protects the waist of the occupant by being deployed by the supply of gas, the flow tube may be connected to the pelvis airbag to supply gas generated by the gas generator to the pelvis airbag, in addition to the torso airbag, and in the flow tube, a part where the pelvis airbag is connected may be located upstream, along the flow of gas, of a part where the torso airbag is connected.

In this way, when the gas generated by the gas generator flows through the flow tube, the supply of gas to the pelvis airbag is started earlier than the supply of gas to the torso airbag. This allows the pelvis airbag to be deployed earlier than the torso airbag. In this airbag device, the pelvis airbag is provided separately from the torso airbag. When such an airbag device is operated, the pelvis airbag is deployed first to restrain the waist of the occupant. The torso airbag is then deployed to restrain the chest of the occupant. By restraining the waist and the chest of the body of the occupant in this order, the shake of the body of the occupant can be suitably suppressed at the time of vehicle collision, and the occupant can be more suitably protected. Furthermore, since the protection of the chest and the protection of the waist are achieved by separate airbags, it is sufficient that an airbag be installed at each of the position corresponding to the chest of the occupant and the position corresponding to the waist. Therefore, the airbag can be miniaturized, and the required amount of gas is reduced. As a result, the entire airbag device can be miniaturized.

The technology of the present disclosure can also be identified as a vehicle seat equipped with any of the airbag devices described above. That is, in the vehicle seat of the present disclosure, the gas generator may be a first gas generator, the airbag device may further include a second gas generator disposed at the seating surface portion spaced apart in the width direction of the vehicle seat from the first gas generator, the first gas generator and the second gas generator may be disposed in a region surrounded by a cushion frame that forms the skeleton of the seating surface portion of the seat frame and attached along a side frame disposed on a side of the buttocks of the occupant of the cushion frame, the cushion frame may be provided with a first cover portion that covers the first gas generator from a seating surface side of the seating surface portion and a second cover portion that covers the second gas generator from the seating surface side, and the seating surface portion may be formed with a holding portion that holds the side buttocks of the occupant from both sides in the width direction of the vehicle seat with the cushion, attached to the cushion frame, covering the first cover portion and the second cover portion.

According to the vehicle seat of the present disclosure, the first gas generator and the second gas generator are attached along the side frame, and are covered by the first cover portion and the second cover portion to form the holding portion, and thus the side buttocks of the occupant can be held from both sides in the width direction by the holding portion. As a result, the holding properties of the vehicle seat can be enhanced.

Furthermore, in the vehicle seat of the present disclosure, the side frame may extend in the depth direction of the vehicle seat at the side of the buttocks of the occupant, and the first gas generator and the second gas generator may have a cylindrical shape having a longer dimension in the axial direction than the dimension in the radial direction and may be attached extending in a direction in which the side frame extends together with the first cover portion and the second cover portion.

In this way, the holding portion can be elongated in the depth direction. Therefore, the range held by the holding portion in the side buttocks of the occupant can be widened. As a result, the holding properties of the vehicle seat can be further enhanced.

Advantageous Effects of Invention

According to the technology of the present disclosure, the backrest portion of the vehicle seat can be thinned, and the airbag can be more rapidly inflated and deployed.

DESCRIPTION OF EMBODIMENTS

An embodiment of an airbag device according to the present disclosure will be hereinafter described with reference to the drawings. Note that each of the configurations, combinations thereof, and the like in each embodiment is an example, and additions, omissions, substitutions, and other changes of the configuration may be made as appropriate without departing from the spirit of the present invention. The present disclosure is not limited by the embodiments and is limited only by the claims.

First Embodiment

Figure 1:
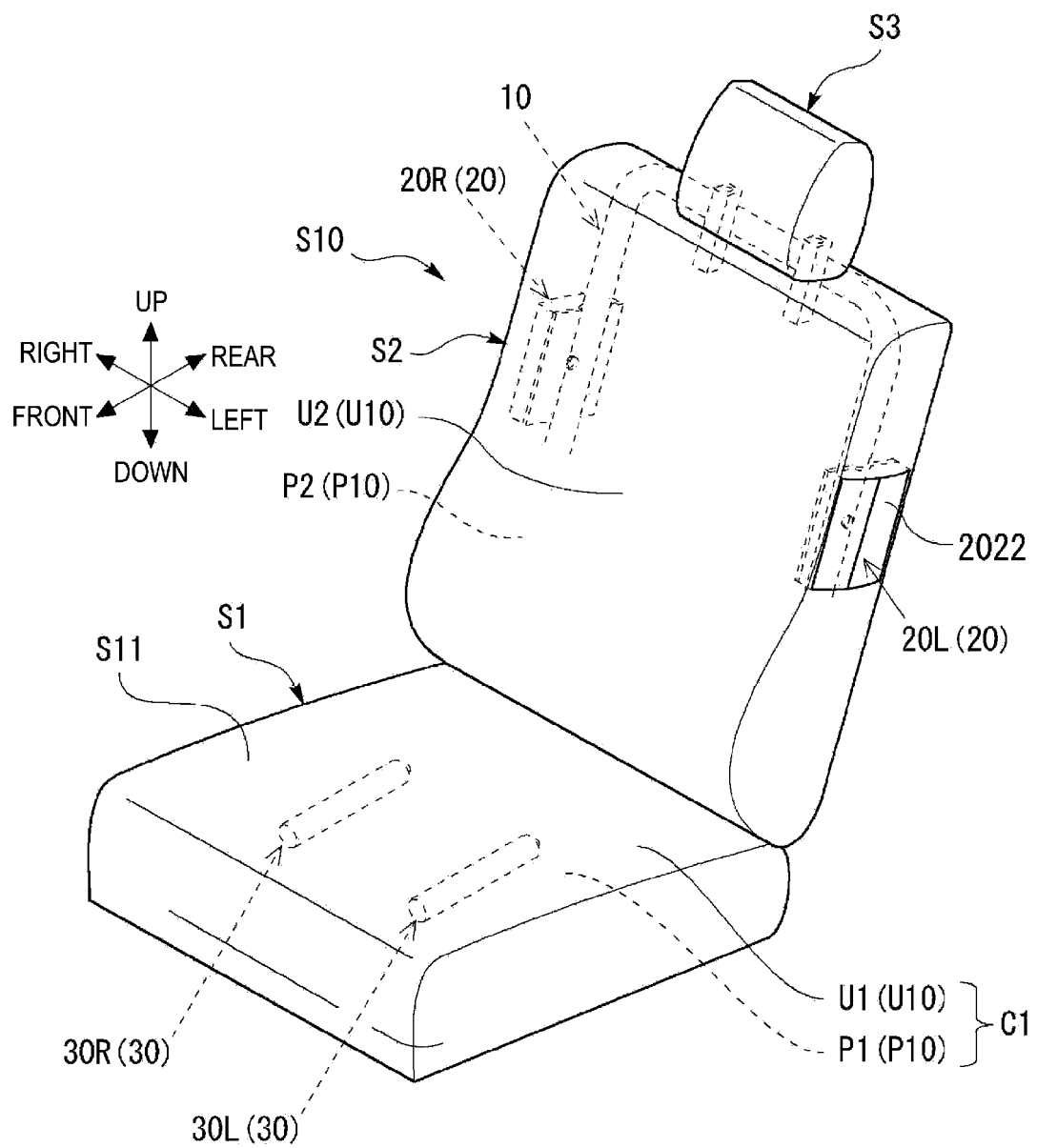
FIG. 1 is a perspective view of a vehicle seat equipped with an airbag device according to a first embodiment.

In the first embodiment, an airbag device provided in a vehicle will be described. FIG. 1 is a perspective view of a vehicle seat S10 equipped with an airbag device according to a first embodiment. The vehicle seat S10 is a seat on which an occupant of the vehicle sits. Note that, in the present specification, each direction in the front-rear direction (the depth direction), the left-right direction (the width direction), and the up-down direction (the height direction) of the vehicle seat S10 will be described with reference to each of the directions of the front-rear, left-right, and up-down, as viewed from the occupant (seated person) seated in the vehicle seat S10.
Overall Configuration As illustrated in FIG. 1, the vehicle seat S10 includes a seat cushion (seating surface portion) S1 that supports the buttocks of the occupant, a seat back (backrest portion) S2 that supports the back of the occupant, and a headrest S3 that supports the head of the occupant, in correspondence with each part of the body of the occupant seated. The seat cushion S1 has a seating surface S11 on which the occupant sits. The seat back S2 is reclinably connected to the rear end portion of the seat cushion S1. The headrest S3 is connected to the upper end portion of the seat back S2 in an up-down movable manner.

The reference sign 10 illustrated in FIG. 1 is a seat frame that forms a skeleton of the vehicle seat S10. The seat frame 10 is formed of a metal material in the present embodiment. Reference sign P10 is a pad covering the seat frame 10. The pad P10 is formed from, for example, urethane foam or the like. Reference sign U10 is an epidermis material that forms an outer surface of the vehicle seat S10. The epidermis material U10 is formed from an appropriate material such as, for example, a fabric or a leather. The seat frame 10 is covered by the pad P10, and the pad P10 is further covered by the epidermis material U10, and thus the vehicle seat S10 is formed.

The pad P10 includes a cushion pad P1 provided in the seat cushion S1 and a back pad P2 provided in the seat back S2. Additionally, the epidermis material U10 includes an epidermis material U1 that is provided in the seat cushion S1 to cover the cushion pad P1, and an epidermis material U2 that is provided in the seat back S2 to cover the back pad P2. The cushion pad P1 and the epidermis material U1 form the cushion C1.

Figure 2:
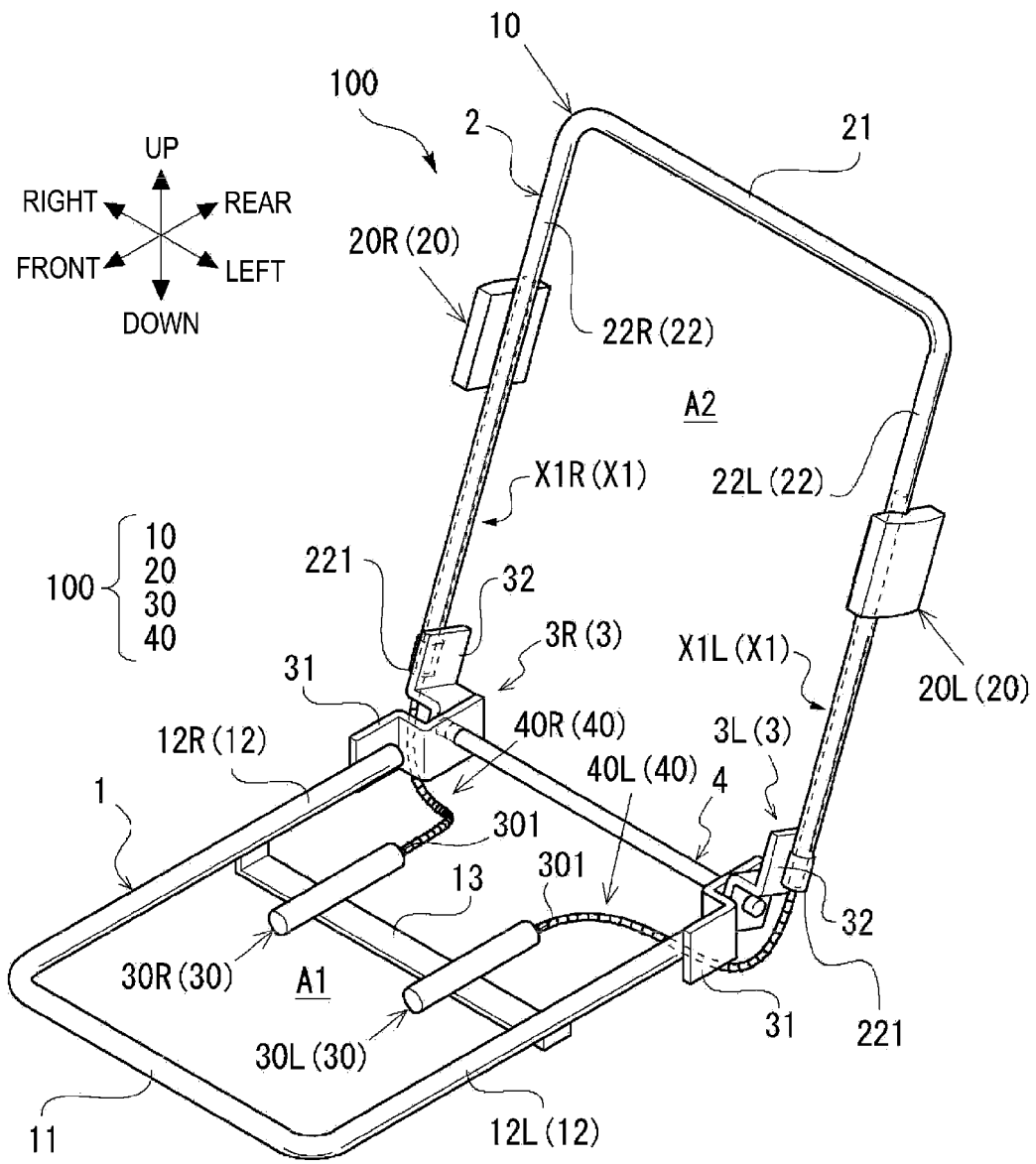
FIG. 2 is a perspective view of the airbag device according to the first embodiment.

The vehicle seat S10 according to the present embodiment includes an airbag device that inflates and deploys the airbag at the time of a collision of the vehicle to restrain and protect the occupant. FIG. 2 is a perspective view of an airbag device 100 according to the present embodiment. As illustrated in FIG. 2, the airbag device 100 includes a seat frame 10, an airbag 20, a gas generator 30, and a conduit 40. The airbag 20 is an airbag for a chest, and is disposed in the seat back S2 and deployed by supply of gas to protect the chest of the occupant. However, the airbag according to the technology of the present disclosure is not limited to that for a chest. The gas generator 30 is disposed in the seat cushion S1 and generates gas to be supplied to the airbag 20. The details will be described later, but as illustrated in FIG. 2, a part that is a portion of the seat frame 10 is formed as a flow tube X1 that connects to an airbag to supply gas generated by the gas generator 30 to the airbag 20. The conduit 40 connects the gas generator 30 and the flow tube X1 to guide the gas generated by the gas generator 30 to the flow tube X1. Each component of the airbag device 100 will be described below.
[Seat frame]

As illustrated in FIG. 2, the seat frame 10 includes a cushion frame 1, a back frame 2, a first coupling frame 3R, a second coupling frame 3L, and a reclining rod (rotating shaft portion) 4.

The cushion frame 1 is a frame that forms a skeleton of the seat cushion S1. The cushion frame 1 includes a front frame 11, a first cushion side frame 12R, a second cushion side frame 12L and a rear frame 13. The front frame 11 extends in the left-right direction and forms the front end of the cushion frame 1. The first cushion side frame 12R extends rearward from the right end portion of the front frame 11 and forms the right side end of the cushion frame 1. The second cushion side frame 12L extends rearward from the left end portion of the front frame 11 and forms the left side end of the cushion frame 1. The first cushion side frame 12R and the second cushion side frame 12L are disposed in the seat frame 10 to be located on the side of the buttocks of the occupant seated in the vehicle seat S10. More specifically, the buttocks of the occupant are located between the first cushion side frame 12R and the second cushion side frame 12L. The front frame 11, the first cushion side frame 12R and the second cushion side frame 12L are formed into an integrated cylindrical shape by bending a metal pipe material having a hollow shape into a U shape. In the present embodiment, the front frame 11, the first cushion side frame 12R, and the second cushion side frame 12L have a cylindrical cross-section, but the cross-sectional shape is not particularly limited. The rear frame 13 is provided on the rear side of the front frame 11 and extends in the left-right direction and couples the first cushion side frame 12R and the second cushion side frame 12L. The rear frame 13 is formed of, for example, a sheet metal with a right end portion connected to the first cushion side frame 12R by welding or the like, and a left end portion connected to the second cushion side frame 12L by welding or the like. The rear frame 13 also functions as a supporting member that supports the gas generator 30. Note that in the following description, when the first cushion side frame 12R and the second cushion side frame 12L are described without distinction, they may be simply referred to as a cushion side frame 12. Here, as illustrated in FIG. 2, a region surrounded by the cushion frame 1 is referred to as a first region A1. In particular, the first region A1 is a region surrounded by the front frame 11, the first cushion side frame 12R, and the second cushion side frame 12L, which are parts that form the outer shape of the skeleton of the seat cushion S1 in the cushion frame 1.

Note that, for example, on the cushion frame 1, a supporting member (not illustrated) such as a spring, a wire, or the like for supporting a seated person seated in the vehicle seat S10 may be disposed over the first cushion side frame 12R and the second cushion side frame 12L and the cushion pad P1 may be placed on the supporting member.

The back frame 2 is a frame that forms a skeleton of the seat back S2, and is formed into a tubular shape by bending a metal pipe material having a hollow shape into a U shape. The back frame 2 includes an upper frame 21, a first back side frame 22R and a second back side frame 22L. The upper frame 21 extends in the left-right direction and forms an upper end of the back frame 2. Note that a bracket (not illustrated) for receiving and attaching a pillar (not illustrated) of the headrest S3 is attached to the upper frame 21 by welding or the like. The first back side frame 22R extends downward (i.e., the seat cushion S1 side) from the right end portion of the upper frame 21 to form the right side end of the back frame 2. The second back side frame 22L extends downward (i.e., the seat cushion S1 side) from the left end portion of the upper frame 21 to form the left side end of the back frame 2. The first back side frame 22R and the second back side frame 22L are disposed on the vehicle seat S10 to be located on the side of the back of the occupant seated in the vehicle seat S10. More specifically, the back of the occupant is located between the first back side frame 22R and the second back side frame 22L. The back frame 2 in the present embodiment has a cylindrical cross-section, but the cross-sectional shape is not particularly limited. Note that in the following description, when the first back side frame 22R and the second back side frame 22L are described without distinction, they may be simply referred to as a back side frame 22. As illustrated in FIG. 2, a portion of the back side frame 22 is formed as a flow tube X1, and also has a function as a flow path of the gas, in addition to the function as a skeleton of the vehicle seat S10. The details of the flow tube X1 will be described later. Here, as illustrated in FIG. 2, a region surrounded by the back frame 2 is referred to as a second region A2. Specifically, the second region A2 is a region surrounded by the upper frame 21, the first back side frame 22R, and the second back side frame 22L, which are parts that form the outer shape of the skeleton of the seat back S2 in the back frame 2.

The first coupling frame 3R and the second coupling frame 3L are members for coupling the cushion frame 1 and the back frame 2. The first coupling frame 3R and the second coupling frame 3L are provided spaced apart in the left and right direction. Hereinafter, when the first coupling frame 3R and the second coupling frame 3L are described without distinction, they are simply referred to as a coupling frame 3. The coupling frame 3 includes a cushion-side coupling frame 31 that is connected to a rear end portion of the cushion side frame 12 of the cushion frame 1 and extends rearward, and a back-side coupling frame 32 that is connected to a lower end portion of the back side frame 22 of the back frame 2 and extends downward. The cushion-side coupling frame 31 is formed of, for example, a sheet metal, and is connected to the cushion side frame 12 by welding or the like. Similarly, the back-side coupling frame 32 is formed of a sheet metal, for example, and is connected to the back side frame 22 by welding or the like. The rear end portions of the cushion-side coupling frame 31 of the first coupling frame 3R and the cushion-side coupling frame 31 of the second coupling frame 3L are coupled by a reclining rod 4 extending in the left-right direction. The reclining rod 4 is a member that forms a rotating shaft of the back frame 2 for reclining the seat back S2, and is formed by a metal pipe material having a hollow shape. The reclining rod 4 is connected to the cushion-side coupling frame 31 of the first coupling frame 3R by welding or the like, with the right end portion of the reclining rod 4 extending through the cushion-side coupling frame 31 of the first coupling frame 3R. In addition, a lower end portion of the back-side coupling frame 32 of the first coupling frame 3R is rotatably born by a part, of the reclining rod 4, projecting out to the right side from the cushion-side coupling frame 31 of the first coupling frame 3R. Similarly, the reclining rod 4 is connected to the cushion-side coupling frame 31 of the second coupling frame 3L by welding or the like, with the left end portion of the reclining rod 4 extending through the cushion-side coupling frame 31 of the second coupling frame 3L. In addition, a lower end portion of the back-side coupling frame 32 of the second coupling frame 3L is rotatably born by a part, of the reclining rod 4, projecting out to the left side from the cushion-side coupling frame 31 of the second coupling frame 3L. As a result, the cushion frame 1 and the back frame 2 are coupled to allow the back frame 2 to rotate with respect to the cushion frame 1.

[Airbag]

As illustrated in FIG. 1, in the seat back S2 of the vehicle seat S10, one airbag 20 is disposed on each of the left side and right side corresponding to the chest of the occupant. Hereinafter, in a case where two airbags 20 are described with distinction, the airbag 20 on the right side is referred to as the first airbag 20R, and the airbag 20 on the left side is referred to as the second airbag 20L, and in a case where the airbags are described without distinction, they are simply referred to as the airbag 20. As illustrated in FIG. 2, the airbag 20 is attached to the back frame 2 in the seat frame 10. More specifically, the first airbag 20R is attached to the first back side frame 22R of the back frame 2, and the second airbag 20L is attached to the second back side frame 22L of the back frame 2. The airbag 20 is attached to an intermediate part of the back side frame 22 in the back frame 2 in the up-down direction. However, the attachment position of the airbag 20 is not limited thereto, and for example, the airbag 20 may be attached to the upper frame 21 of the back frame 2.

Figure 3:
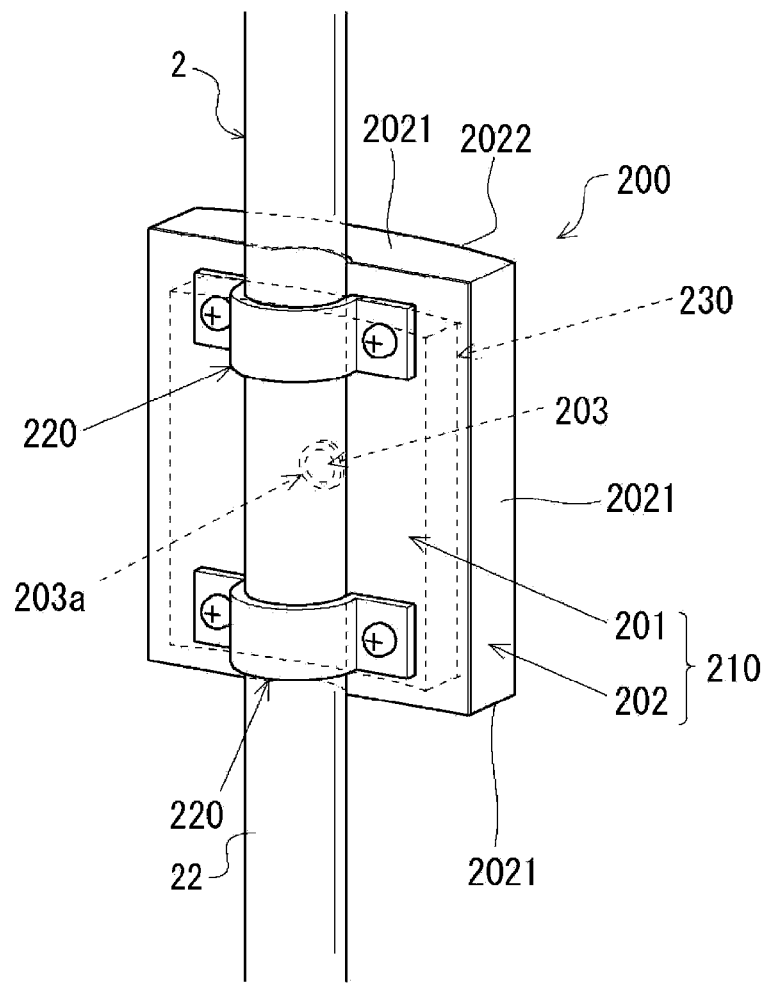
FIG. 3 is a schematic configuration diagram of an airbag according to the first embodiment.

FIG. 3 is a schematic configuration diagram of the airbag 20. As illustrated in FIG. 3, the airbag 20 includes a case 210, an attachment bracket 220 for attaching the case 210 to the back frame 2, and an airbag bag body 230 housed within the case 210 and inflated by gas supplied from the gas generator 30.

The case 210 includes a rear surface plate 201 and a case body 202, and is formed into a box shape as a whole. The rear surface plate 201 is, for example, a metal plate member, and is fastened and fixed to the back side frame 22 of the back frame 2 by the attachment bracket 220. An introduction hole 203 is formed as a through hole that extends through the rear surface plate 201 in the plate thickness direction. The introduction hole 203 is an opening for introducing gas for inflating the airbag bag body into the interior of the case 210. The introduction hole 203 is formed at a position facing the back side frame 22 of the back frame 2 in the rear surface plate 201. Furthermore, a seal member 203a formed in an annular shape with an elastic material such as rubber is provided on the peripheral edge portion of the introduction hole 203 in the rear surface plate 201. The seal member 203a may be, for example, adhered to the rear surface plate 201 with valcanization.

The case body 202 of the case 210 is formed of, for example, a resin, and includes a side surface portion 2021 and a front surface portion 2022. The side surface portion 2021 stands upright from the rear surface plate 201 and forms a side surface of the case 210. The front surface portion 2022 is connected to the distal end of each side surface portion 2021 to face the rear surface plate 201, and forms a front surface of the case 210. Note that the case body 202 and the rear surface plate 201 can be integrally fixed by an appropriate method. As illustrated in FIG. 1, in the vehicle seat S10, the surface of the front surface portion 2022 of the case body 202 is exposed to the outside from the opening formed in the epidermis material U2 of the seat back S2, and is flush with the surface of the epidermis material U2.

The airbag bag body 230 is housed in a state where the airbag bag body is folded inside the case 210. The airbag bag body can be housed within the case 210 in a known folding manner. For example, the airbag bag body may be folded by bellow folding or folded by roll folding, or may be folded by a combination thereof

[Gas Generator]

As illustrated in FIG. 1, in the seat cushion S1 of the vehicle seat S10, one gas generator 30 is disposed on each of the left side and right side corresponding to the left and right airbags 20. Hereinafter, in a case where the two gas generators 30 are described with distinction, the gas generator 30 on the right side is referred to as the first gas generator 30R, and the gas generator 30 on the left side is referred to as the second gas generator 30L, and when the gas generators are described without distinction, they are simply referred to as the gas generator 30. The first gas generator 30R generates gas to be supplied to the first airbag 20R. The second gas generator 30L generates gas to be supplied to the second airbag 20L. The first gas generator 30R and the second gas generator 30L are disposed at intervals in the left-right direction (i.e., the width direction of the vehicle seat S10), and are supported by the rear frame 13 of the cushion frame 1.

The gas generator 30 has a long cylindrical shape in an axial direction. More specifically, the gas generator 30 has a cylindrical shape having a longer dimension in the axial direction than the dimension in the radial direction. As illustrated in FIG. 2, the gas generator 30 is disposed in the first region A1 with the axial direction thereof coinciding with the front-rear direction. An ejection hole 301 for ejecting gas is formed at the rear end portion of the gas generator 30. The gas generator 30 is activated under control of the airbag ECU mounted on the vehicle, and generates gas. Note that the method in which the gas generator according to the present disclosure generates gas is not particularly limited. The type of gas generator includes a pyro-type that generates gas by combusting a solid gas generating agent, a stored gas-type that uses pressurized gas, a hybrid type combining the pyro-type and the stored gas type, for example.

[Conduit]

The conduit 40 is a tubular member in which gas can flow. As illustrated in FIG. 2, the airbag device 100 includes two conduits 40 corresponding to the first gas generator 30R and the second gas generator 30L. The conduit 40 corresponding to the first gas generator 30R is referred to as a first conduit 40R, and the conduit 40 corresponding to the second gas generator 30L is referred to as a second conduit 40L, and when they are described without distinction, they are simply referred to as a conduit 40. One end of the first conduit 40R is connected to the ejection hole 301 of the first gas generator 30R, and the other end is connected to the lower end portion 221 of the first back side frame 22R of the back frame 2. One end of the second conduit 40L is connected to the ejection hole 301 of the second gas generator 30L, and the other end is connected to the lower end portion 221 of the second back side frame 22L of the back frame 2. Connecting the conduit 40 to the ejection hole 301 of the gas generator 30 allows the gas ejected from the gas generator 30 to flow into the conduit 40. Here, the conduit 40 has at least a portion formed of a material having flexibility, and can be bent in any direction. As a result, the rotating of the back frame 2 with respect to the cushion frame 1 associated with the reclining of the seat back S2 is not inhibited by the conduit 40 connecting the gas generator 30 and the back frame 2.

[Flow Tube]

Figure 4:
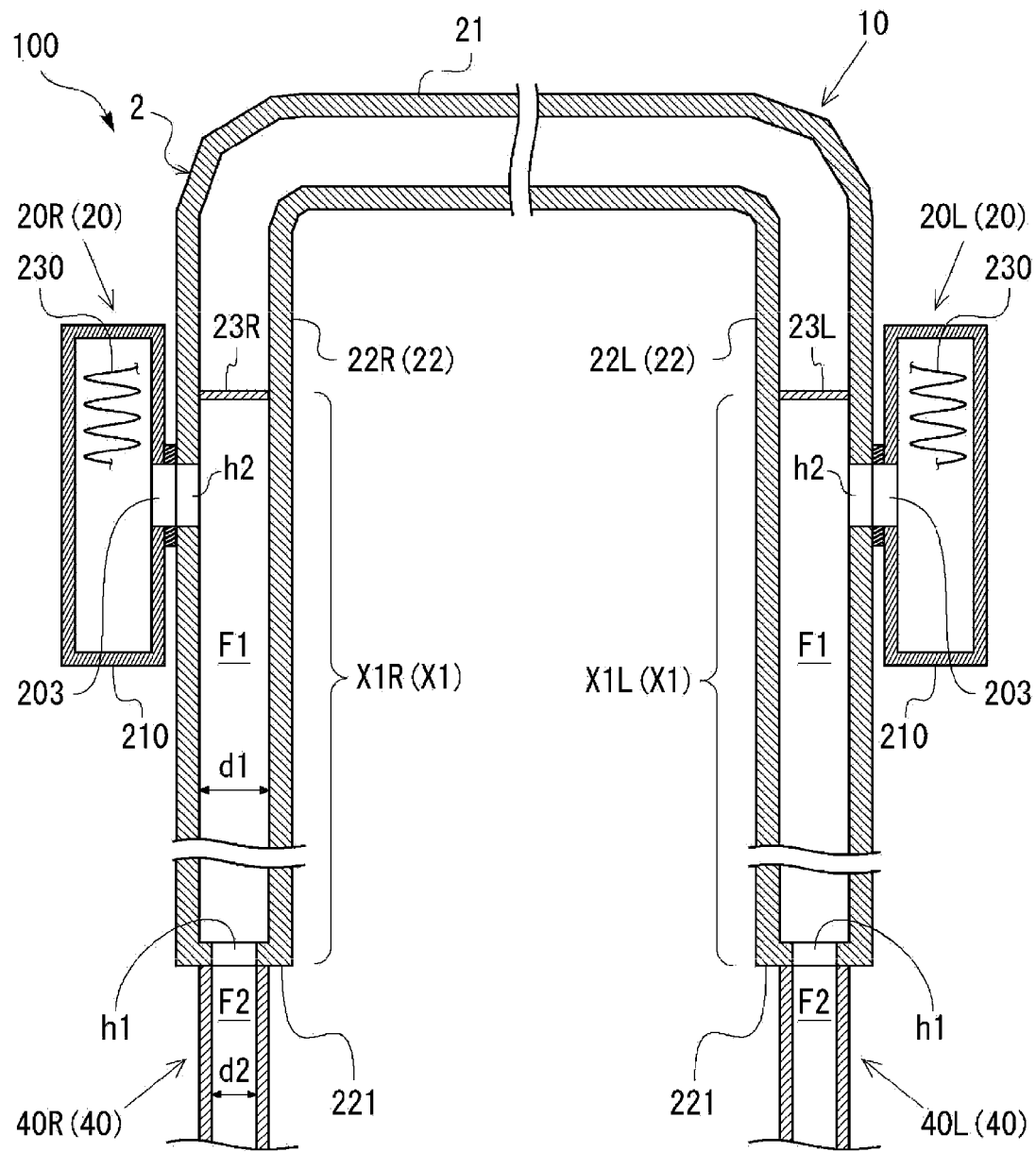
FIG. 4 is a schematic configuration diagram for describing a flow tube according to the first embodiment.

As described above, in the present embodiment, a portion of the seat frame 10, which is also a portion of the back side frame 22 of the back frame 2, is formed as a flow tube X1 that connects to the airbag 20 to supply gas generated by the gas generator 30 to the airbag 20. FIG. 4 is a schematic configuration diagram for describing a flow tube according to the first embodiment. In FIG. 4, a cross-section orthogonal to the front-rear direction (the depth direction) is illustrated.

As illustrated in FIG. 4, a portion of the first back side frame 22R of the back frame 2 is formed as a first flow tube X1R for supplying gas from the first gas generator 30R to the first airbag 20R. A portion of the second back side frame 22L of the back frame 2 is formed as a second flow tube X1L for supplying gas from the second gas generator 30L to the second airbag 20L. Hereinafter, when the first flow tube X1R and the second flow tube X1L are described without distinction, they are simply referred to as a flow tube X1. The flow tube X1 utilizes the hollow shape of the back side frame 22 of the back frame 2 as a gas flow path. The flow tube X1 is formed by a part, of the back side frame 22, that continues from the lower end portion 221 to which the conduit 40 is connected to the part where the airbag 20 is attached. Here, an inflow hole h1 that communicates with the conduit 40 is formed in the lower end portion 221 of the back side frame 22. As a result, the flow tube X1 and the conduit 40 are connected, and thus the gas flowing from the conduit 40 flows into the flow tube X1 through the inflow hole h1. In addition, a supply hole h2 in communication with the introduction hole 203 is formed at a position corresponding to the introduction hole 203 of the airbag 20 at a part where the airbag 20 is attached in the back side frame 22. As a result, the flow tube X1 and the airbag 20 are connected, and thus the gas flowing in the flow tube X1 is supplied to the airbag 20 through the supply hole h2 and the introduction hole 203. As described above, the flow tube X1 forms a part of the flow path for the gas generated by the gas generator 30 to flow from the gas generator 30 to the airbag 20. Hereinafter, in the flow path of the gas, the flow path formed by the flow tube X1 is referred to as a flow path F1, and the flow path formed by the conduit 40 is referred to as a flow path F2. Here, the reference sign d1 in FIG. 4 indicates the inner diameter of the back side frame 22, that is, the inner diameter of the flow tube X1. Also, the reference sign d2 indicates the inner diameter of the conduit 40. In the airbag device 100 according to the present embodiment, d1 is set to be larger than d2 in dimension. As a result, the cross-sectional area of the flow path F1 of the gas in the flow tube X1 is greater than the cross-sectional area of the flow path F2 in the conduit 40. Note that the cross-sectional area here refers to an area of a cross-section orthogonal to the direction in which the gas flows, and specifically, the cross-section orthogonal to the extending direction of the flow tube X1.

Furthermore, as illustrated in FIG. 4, a first partition wall 23R that partitions the space in the first back side frame 22R into an upper portion and a lower portion is provided inside the first back side frame 22R. The first partition wall 23R is a metal disc member having an outer diameter equal to the inner diameter of the first back side frame 22R, and is welded over the entire periphery to the inner wall of the first back side frame 22R at a position above the supply hole h2 formed in the first back side frame 22R. In addition, a second partition wall 23L that partitions the space in the second back side frame 22L into an upper portion and a lower portion is provided inside the second back side frame 22L. The second partition wall 23L is a metal disc member having an outer diameter equal to the inner diameter of the second back side frame 22L, and is welded over the entire periphery to the inner wall of the second back side frame 22L at a position above the supply hole h2 formed in the second back side frame 22L. As a result, the terminal end (upper end) of the first flow tube X1R and the second flow tube X1L is defined, and the first flow tube X1R and the second flow tube X1L are separated. As a result, the gas from the first gas generator 30R that has flowed into the first flow tube X1R is prevented from being supplied to the second airbag 20L through the upper frame 21. Furthermore, the gas from the second gas generator 30L that has flowed into the second flow tube X1L is prevented from being supplied to the first airbag 20R through the upper frame 21.

Operation

Figure 5:
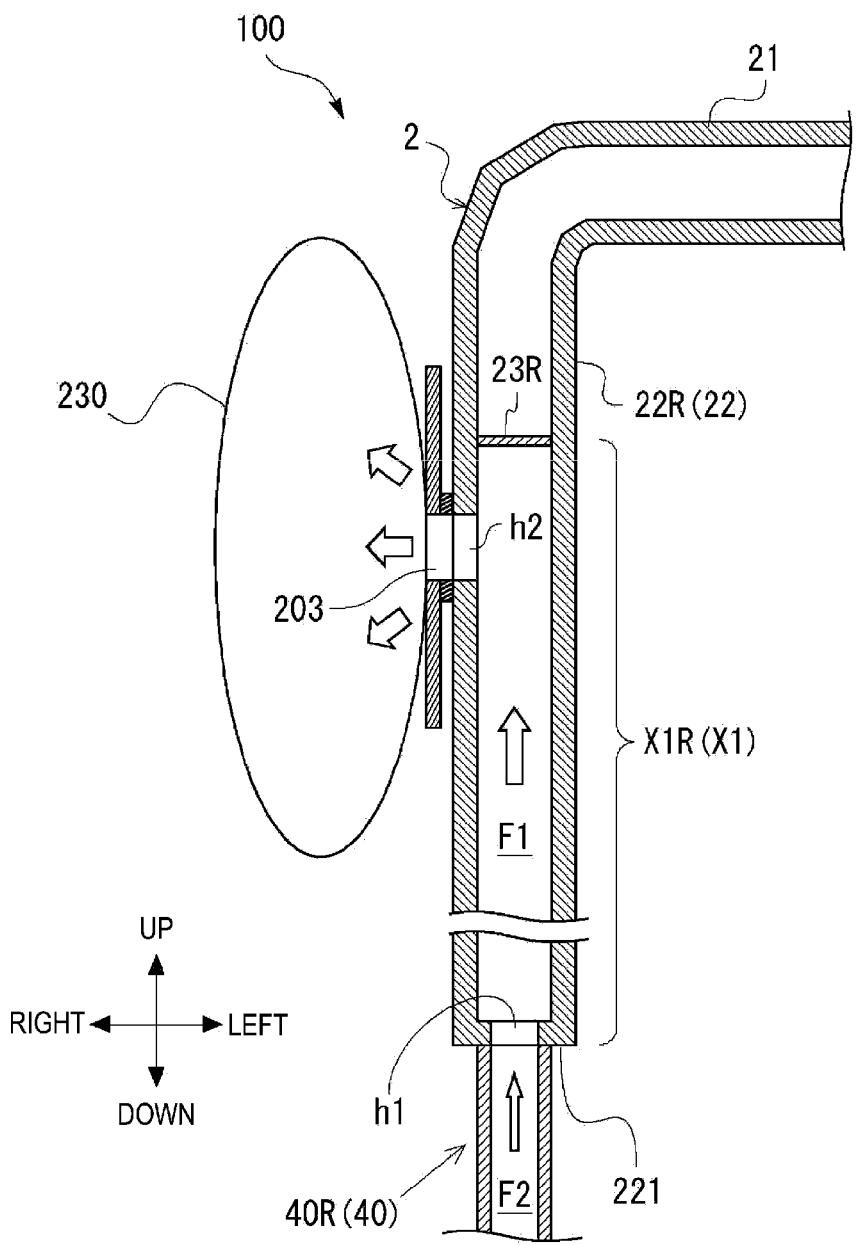
FIG. 5 is a schematic configuration diagram for describing an operation of the airbag device according to the first embodiment.

FIG. 5 is a schematic configuration diagram for describing an operation of the airbag device 100 according to the first embodiment. Hereinafter, the deployment operation of the airbag device 100 according to the first embodiment will be described. When the airbag ECU detects a collision of a vehicle based on a signal from a collision sensor (not illustrated), an operation current (ignition current) is supplied to the gas generator 30. Accordingly, the gas generator 30 is activated, and gas is ejected from the ejection hole 301. The gas ejected from the ejection hole 301 flows into the conduit 40. The gas flowing into the conduit 40 flows through the conduit 40 and flows into the flow tube X1 through the inflow hole h1. The gas that has flowed into the flow tube X1 flows upward in the flow tube X1 along the extending direction (axial direction) of the back side frame 22, and flows into the case 210 through the supply hole h2 and the introduction hole 203. Thus, the gas generated by the gas generator 30 is supplied to the airbag 20. When the supply of gas to the airbag 20 is started, the airbag bag body 230 in the folded state in the case 210 is inflated. Thus, the case 210 is raptured by the inflation pressure of the airbag bag body 230, and the airbag bag body 230 is ejected from the case 210 while inflating. As described above, the first airbag 20R and the second airbag 20L are deployed, and the chest of the occupant is restrained. As a result, the occupant is protected. Note that the airbag device 100 may operate the first gas generator 30R and the second gas generator 30L independently, and deploy the first airbag 20R and the second airbag 20L independently depending on how the impact is applied.

[Actions and Effects]

As described above, the airbag device 100 according to the present embodiment employs a structure in which the airbag 20 is disposed in the seat back S2 of the vehicle seat S10, and the gas generator 30 is disposed in the seat cushion S1. In this way, the seat back can be made thin, by not disposing the gas generator 30 in the seat back S2, compared to a known airbag device in which both the airbag and the gas generator are disposed in the seat back. In addition, since the seat cushion has a wide space in which the components can be disposed as compared to the seat back, the gas generator can be disposed without significantly enlarging the seat cushion. Furthermore, in the airbag device 100 according to the present embodiment, a portion of the back frame 2 in the seat frame 10 is formed as a flow tube X1 that connects to the airbag 20 to supply gas generated by the gas generator 30 to the airbag 20. In other words, in the airbag device 100, a portion of the flow path for supplying gas from the gas generator 30 disposed in the seat cushion S1 to the airbag 20 disposed in the seat back S2 is formed by the back frame 2. The seat frame for forming the skeleton of the vehicle seat typically has a sufficient thickness (cross-sectional area) to ensure the strength necessary for the structure. A cross-sectional area of the flow path of the gas in the flow tube X1 can be ensured by forming a portion of such a seat frame 10 as the flow tube X1. This makes it possible to reduce the ventilation resistance and increase the flow rate and flow speed of the gas flowing through the flow tube X1. As a result, gas can be quickly supplied to the airbag 20, and the airbag 20 can be rapidly deployed. Furthermore, a portion of the seat frame 10 that forms the skeleton of the vehicle seat S10 is also utilized as the flow tube X1, and thus the material cost can be reduced and the weight of the seat itself can be reduced. In particular, by utilizing a portion of the back frame 2 forming the skeleton of the seat back S2 as the flow tube X1, the space required in the seat back S2 can be reduced in comparison to a case where a member separate from the back frame 2 is provided in the seat back S2 and gas is supplied to the airbag 20 by the separate member. As a result, the seat back S2 can be made thinner and lighter.

Note that in the example described above, the flow tube X1 is formed only by a portion of the back side frame 22 of the back frame 2, but the technology of the present disclosure is not limited thereto. The part of the seat frame forming the flow tube can be changed depending on the attachment position of the airbag, and the part of the occupant to protect. The flow tube may be formed by a part that is a portion of the seat frame and includes at least a portion of the back frame. For example, the flow tube X1 may include a portion of the upper frame 21, or may include a portion of the reclining rod 4 or a portion of the cushion frame 1 in addition to a portion of the back frame 2. Furthermore, in the example described above, a case in which the airbag 20 is directly attached to the back frame 2 has been described, but the airbag may not be directly attached to the back frame. For example, the airbag may be attached to a member separate from the back frame, and the flow tube and the airbag may be connected by a tube member or the like.

Additionally, in the airbag device 100 according to the present embodiment, the airbag 20 is connected to the intermediate part of the back side frame 22 that forms the flows tube X1, and the conduit 40 is connected to the lower end portion 221 of the back side frame 22. In other words, the conduit 40 that guides the gas from the gas generator 30 to the flow tube X1 is connected to a part, in the flow tube X1, closer to the seat cushion S1 where the gas generator 30 is disposed than the part where the airbag 20 is connected. Thus, the distance between the gas generator 30 and the part where the conduit 40 is connected in the flow tube X1 can be shortened, and the length of the conduit 40 can be shortened. As a result, the gas can be guided to the flow tube X1 at an early stage, and the gas can be quickly supplied to the airbag 20. As a result, the airbag 20 can be deployed more rapidly. In addition, since the conduit 40 can be shortened, the handling of the conduit 40 in the seat is facilitated, and the entanglement of the conduit 40 and the like can be suppressed. Furthermore, the material cost can be reduced and the weight of the seat itself can be reduced. In particular, in the airbag device 100, the flow tube X1 includes a lower end portion 221, which is an end portion on the seat cushion S1 side, of the back frame 2, and is configured to connect the conduit 40 to the lower end portion 221. In other words, the conduit 40 is configured to be connected to a part of the back frame 2 closest to the seat cushion S1. Therefore, the length of the conduit 40 can be further shortened.

Furthermore, in the airbag device 100 according to the present embodiment, the cross-sectional area of the gas flow path F1 in the flow tube X1 is set to be greater than the cross-sectional area of the flow path F2 in the conduit 40. Thus, the flow rate and the flow speed of the gas in the flow tube X1 can be made greater than the flow rate and the flow speed of the gas in the conduit 40. As a result, gas can be supplied to the airbag 20 more quickly, and the airbag 20 can be deployed more rapidly. In this case, by reducing the length of the conduit 40, the gas can be guided at an early stage to the flow tube X1 in which flow rate and flow speed of the flowing gas are large, and thus the airbag 20 can be deployed more rapidly.

Modified Example

Hereinafter, an airbag device according to a modified example of the first embodiment will be described. In the explanation of the modified example, a difference from the airbag device 100 described with reference to FIGS. 1 to 5 will be mainly described, and detailed description on the parts similar to those of the airbag device 100 will be omitted.

First Modified Example

Figure 6:
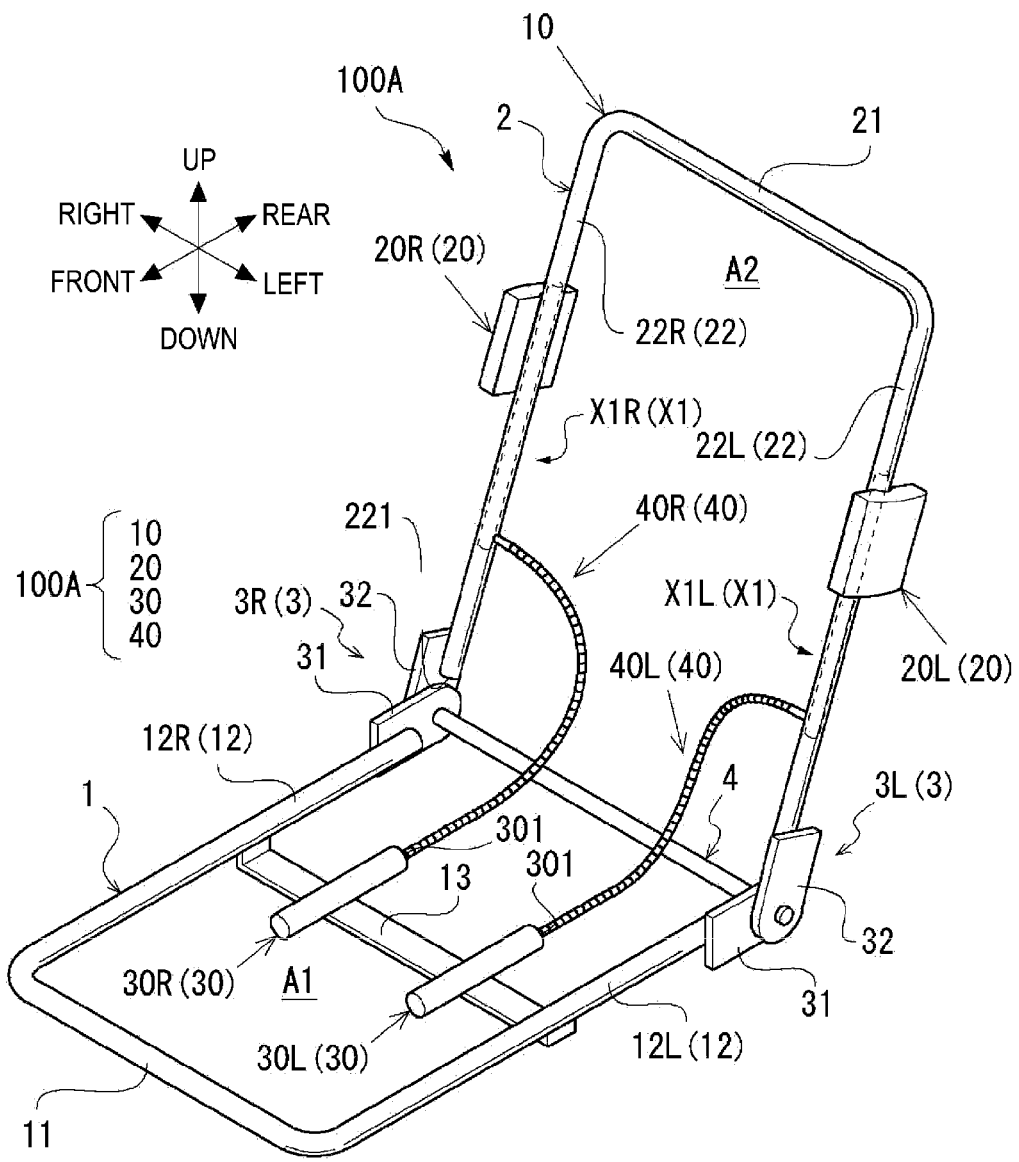
FIG. 6 is a perspective view of an airbag device according to a first modified example of the first embodiment.

FIG. 6 is a perspective view of an airbag device 100A according to a first modified example of the first embodiment. As illustrated in FIG. 6, in the airbag device 100A, the conduit 40 is connected to a corresponding part of the flow tube X1 from the second region A2 side. In other words, the airbag device 100A according to the first modified example has a structure in which the gas generator 30 is disposed in the first region A1, which is a region surrounded by the cushion frame 1, and the conduit 40 is connected to the flow tube X1 from the second region A2, which is a region surrounded by the back frame 2. Thus, the conduit 40 can connect the gas generator 30 and the flow tube X1 without extending outside the region including the first region A1 and the second region A2. According to the airbag device 100A of the first modified example described above, the conduit 40 can be accommodated on the inner side of the seat frame 10. As a result, the vehicle seat S10 can be made compact.

Second Modified Example

Figure 7:
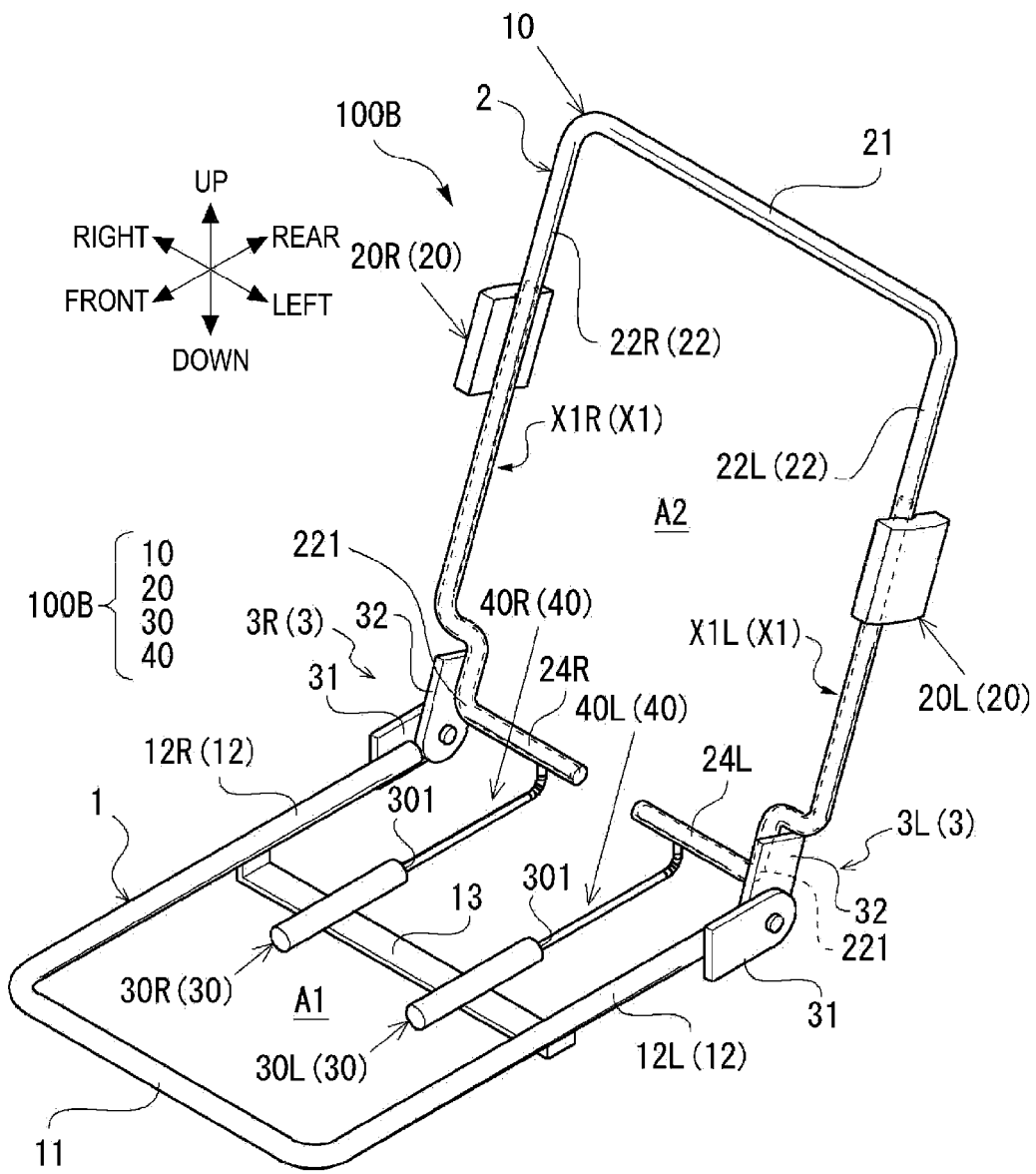
FIG. 7 is a perspective view of an airbag device according to a second modified example of the first embodiment.

FIG. 7 is a perspective view of an airbag device 100B according to a second modified example of the first embodiment. As illustrated in FIG. 7, the back frame 2 of the airbag device 100B further includes a first lower frame 24R extending in the left direction from the lower end portion 221 of the first back side frame 22R toward the second back side frame 22L, and a second lower frame 24L extending in the right direction from the lower end portion 221 of the second back side frame 22L toward the first back side frame 22R. The first lower frame 24R has a hollow shape that is continuous with the first back side frame 22R, and the second lower frame 24L has a hollow shape that is continuous with the second back side frame 22L. Furthermore, the distal ends of the first lower frame 24R and the second lower frame 24L are both closed and spaced apart from each other. Hereinafter, when the first lower frame 24R and the second lower frame 24L are described without distinction, they are simply referred to as the lower frame 24. Note that in the airbag device 100B, the seat frame 10 does not have a reclining rod 4, and the back-side coupling frame 32 of the coupling frame 3 is rotatably born by the cushion-side coupling frame 31.

In the airbag device 100B according to the second modified example, the first conduit 40R is connected to the first lower frame 24R, and the second conduit 40L is connected to the second lower frame 24L. In addition, the first flow tube X1R of the second modified example is formed by a part of the back frame 2 that continues from a part where the first conduit 40R is connected to a part where the first airbag 20R is connected. The second flow tube X1L is formed by a part of the back frame 2 that continues from a part where the second conduit 40L is connected to a part where the second airbag 20L is connected. As illustrated in FIG. 7, the lower frame 24 is disposed near the rotating shaft of the back frame 2 and is disposed on the inner side of the outer shape of the skeleton formed by the vehicle seat S10. The length of the conduit 40 can be made shorter in such an airbag device 100B with the lower frame 24 and the gas generator 30 disposed in the first region A1 connected by the conduit 40. As a result, the gas can be guided to the flow tube X1 at an early stage, and the gas can be quickly supplied to the airbag 20. As a result, the airbag 20 can be deployed more rapidly.

Third Modified Example

Figure 8:
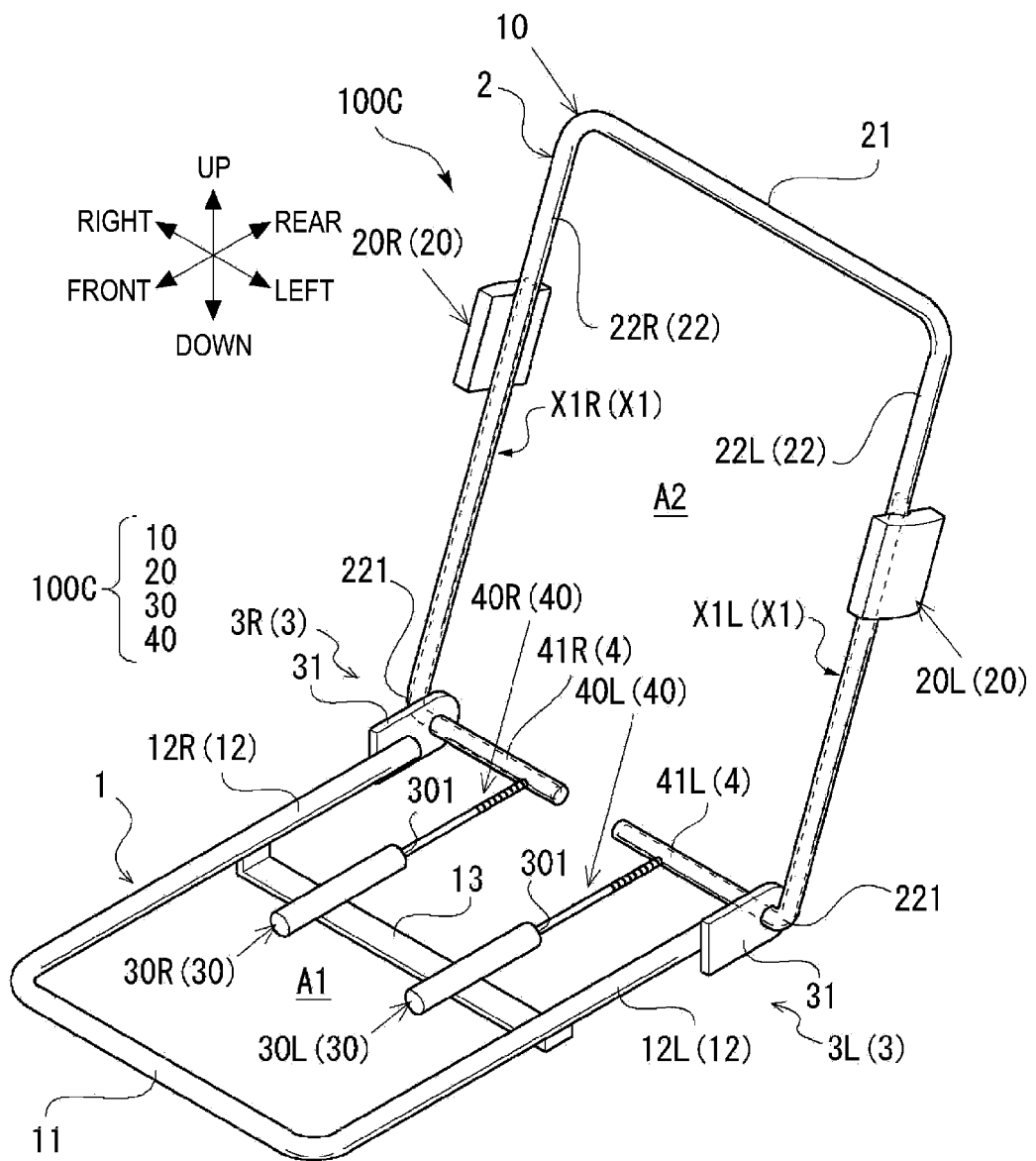
FIG. 8 is a perspective view of an airbag device according to a third modified example of the first embodiment.

FIG. 8 is a perspective view of an airbag device 100C according to a third modified example of the first embodiment. As illustrated in FIG. 8, in the airbag device 100C, a part that is a portion of the seat frame 10 and includes a portion of the back frame 2 forming the skeleton of the seat back S2 and a portion of the reclining rod 4 forming the rotating shaft of the seat back S2 is formed as the flow tube X1.

In the seat frame 10 of the airbag device 100C, the back frame 2 and the reclining rod 4 are integrally formed. The reclining rod 4 according to the third modified example includes a first rod 41R extending in the left direction from the lower end portion 221 of the first back side frame 22R of the back frame 2 toward the second back side frame 22L, and a second rod 41L extending in the right direction from the lower end portion 221 of the second back side frame 22L toward the first back side frame 22R. The first rod 41R has a hollow shape that is continuous with the first back side frame 22R, and the second rod 41L has a hollow shape continuous with the second back side frame 22L. Furthermore, the distal ends of the first rod 41R and the second rod 41L are both closed and are spaced apart from each other. Note that in the airbag device 100C, the coupling frame 3 does not have the back-side connecting frame 32, and the reclining rod 4 formed integrally with the back frame 2 is rotatably born by the cushion-side coupling frame 31.

In the airbag device 100C according to the third modified example, the first conduit 40R is connected to the first rod 41R, and the second conduit 40L is connected to the second rod 41L. In addition, the first flow tube X1R of the third modified example is formed by a part that continues from the part where the first conduit 40R is connected to the part where the first airbag 20R is connected in the seat frame 10, and the second flow tube X1L is formed by a part that continues from a part where the second conduit 40L is connected to a part where the second airbag 20L is connected in the seat frame 10. In other words, the airbag device 100C according to the third modified example is configured to connect, by the conduit 40, the gas generator 30 disposed in the seat cushion S1 and the reclining rod 4, which can serve as the shaft of rotation for the back frame 2 with respect to the seat cushion S1. According to the airbag device 100C of the third modified example described above, the length of the conduit 40 can be shortened. As a result, the gas can be guided to the flow tube X1 at an early stage, and the gas can be quickly supplied to the airbag 20. As a result, the airbag 20 can be deployed more rapidly. Note that, in the example described above, a part that is a portion of the seat frame 10 and is formed of the entirety of the reclining rod 4 and a portion of the back frame 2 is formed as a flow tube X1, but the technology of the present disclosure is not limited thereto. A part that is a portion of the seat frame 10 and includes at least a portion of the back frame 2 and at least a portion of the reclining rod 4 may be formed as the flow tube X1.

Fourth Modified Example

Figure 9:
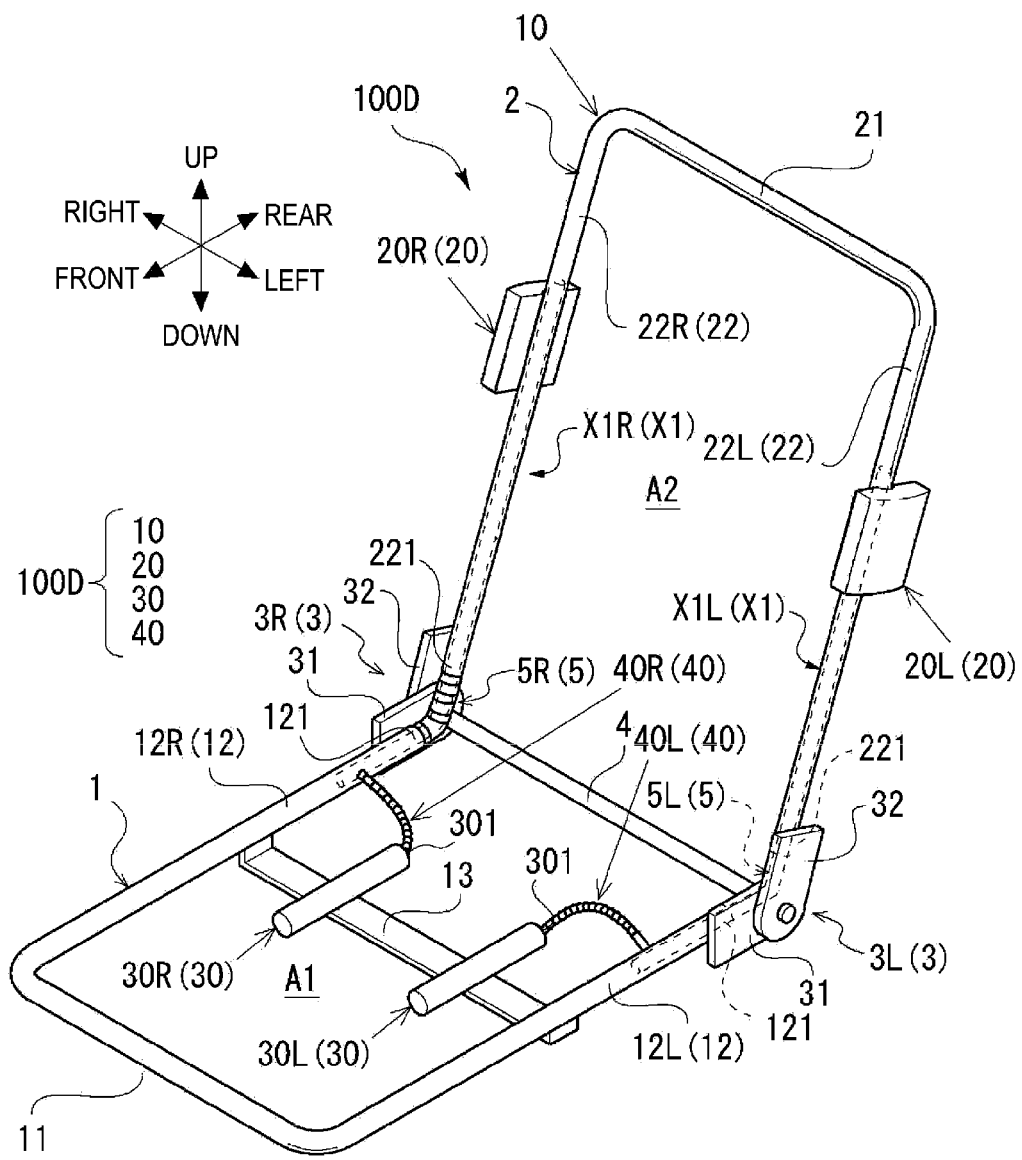
FIG. 9 is a perspective view of an airbag device according to a fourth modified example of the first embodiment.

FIG. 9 is a perspective view of an airbag device 100D according to a fourth modified example of the first embodiment. As illustrated in FIG. 9, in the airbag device 100D, a part that is a portion of the seat frame 10 and includes a portion of the back frame 2 and a portion of the cushion frame 1, is formed as a flow tube X1.

The seat frame 10 of the airbag device 100D includes a first coupling tube 5R and a second coupling tube 5L that connect the cushion frame 1 and the back frame 2. The first coupling tube 5R connects the rear end portion 121 of the first cushion side frame 12R of the cushion frame 1 and the lower end portion 221 of the first back side frame 22R of the back frame 2. The second coupling tube 5L connects the rear end portion 121 of the second cushion side frame 12L of the cushion frame 1 and the lower end portion 221 of the second back side frame 22L of the back frame 2. Hereinafter, when the first coupling tube 5R and the second coupling tube 5L are described without distinction, they are simply referred to as a coupling tube 5.

The coupling tube 5 is a tubular member through which gas can flow. The coupling tube 5 connects the rear end portion 121 of the cushion side frame 12 and the lower end portion 221 of the back side frame 22 to guide the gas flowing in the cushion side frame 12 into the back side frame 22. In addition, the coupling tube 5 has at least one portion formed by a material having flexibility and can be bent in any direction, and thus does not inhibit the rotation of the back frame 2 with respect to the cushion frame 1 associated with the reclining of the seat back S2.

As illustrated in FIG. 9, in the airbag device 100D according to the fourth modified example, the conduit 40 is connected to the cushion side frame 12 of the cushion frame 1. More specifically, the first gas generator 30R and the first cushion side frame 12R are connected by the first conduit 40R, and the second gas generator 30L and the second cushion side frame 12L are connected by the second conduit 40L. In addition, the first flow tube X1R of the fourth modified example is formed by a part of the seat frame 10 that continues from the part where the first conduit 40R is connected to the part where the first airbag 20R is connected, and the second flow tube X1L is formed by a part of the seat frame 10 that continues from a part where the second conduit 40L is connected to a part where the second airbag 20L is connected. In the airbag device 100D, the gas guided from the gas generator 30 to the flow tube X1 by the conduit 40 is supplied to the airbag 20 through the cushion side frame 12, the coupling tube 5, and the back side frame 22.

The airbag device 100D according to the fourth modified example is configured to connect, by the conduit 40, the gas generator 30 disposed in the seat cushion S1 and the cushion frame 1 that forms the skeleton of the seat cushion S1. According to the airbag device 100D of the fourth modified example described above, the length of the conduit 40 can be shortened. As a result, the gas can be guided to the flow tube X1 at an early stage, and the gas can be quickly supplied to the airbag 20. As a result, the airbag 20 can be deployed more rapidly.

Fifth Modified Example

Figure 10:
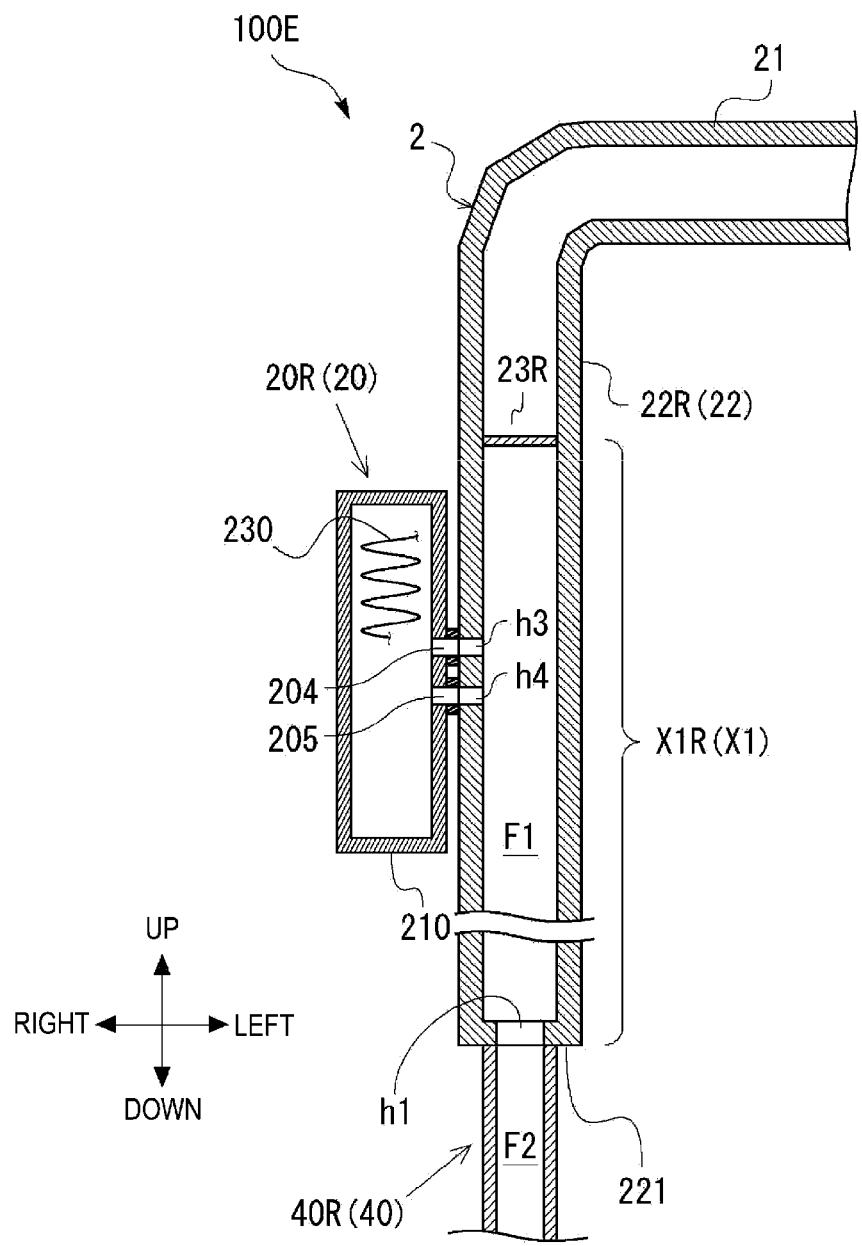
FIG. 10 is a schematic configuration diagram for describing a flow tube according to a fifth modified example of the first embodiment.
Figure 11:
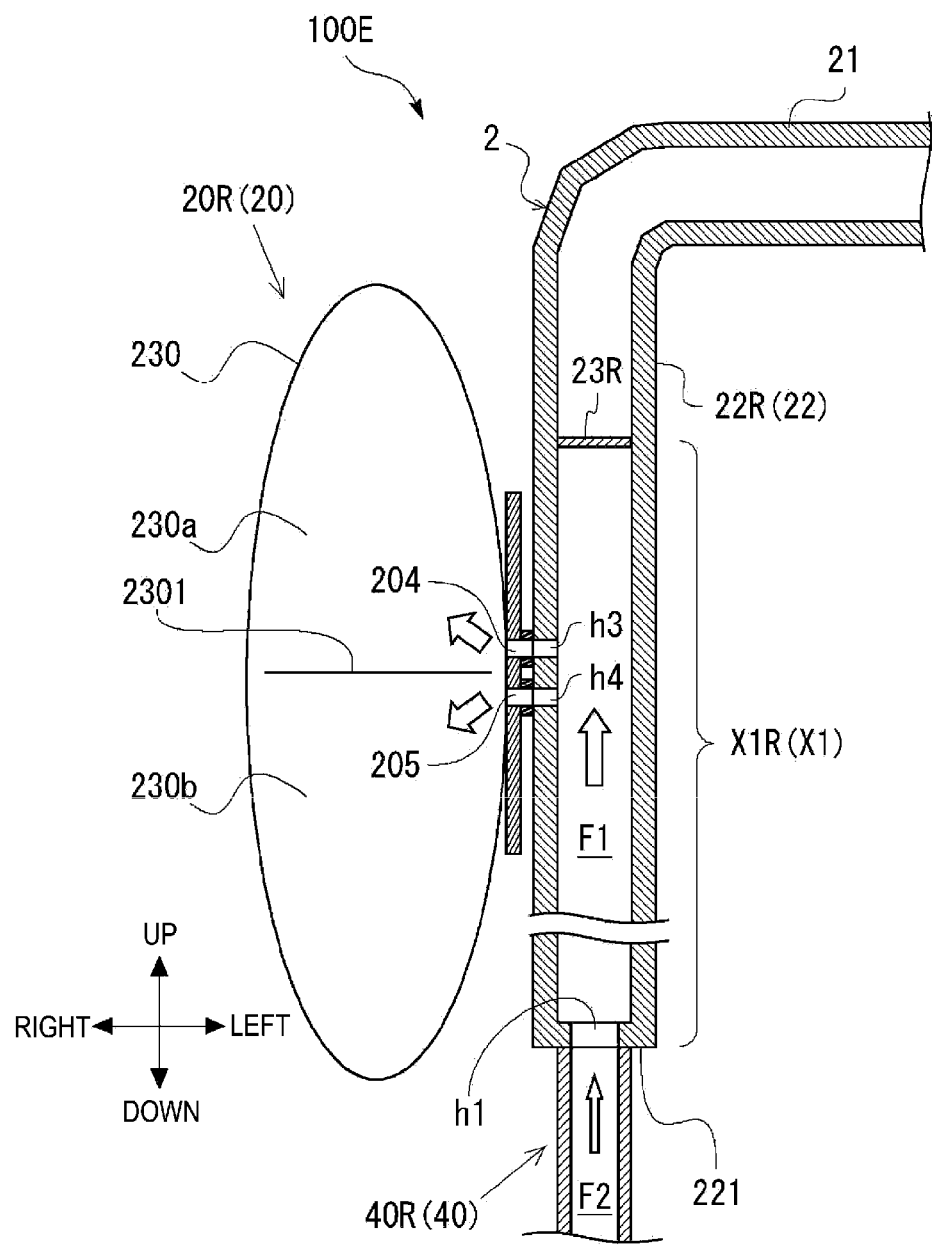
FIG. 11 is a schematic configuration diagram for describing an operation of an airbag device according to the fifth modified example of the first embodiment.

FIG. 10 is a schematic configuration diagram for describing a flow tube according to a fifth modified example of the first embodiment. FIG. 11 is a schematic configuration diagram for describing an operation of an airbag device 100E according to a fifth modified example of the first embodiment. As illustrated in FIG. 11, an airbag bag body 230 of the airbag 20 according to the fifth modified example is divided into a first inflating portion 230$a$ and a second inflating portion 230$b$ by a partition material 2301 provided therein. The first inflating portion 230$a$ is a part of the airbag bag body corresponding to the chest of the occupant, and is inflated by the supply of gas to protect the chest of the occupant. The second inflating portion 230$b$ is a part of the airbag bag body corresponding to the waist of the occupant, and is inflated by the supply of gas to protect the waist of the occupant. The second inflating portion 230$b$ is inflated at a position below the position where the first inflating portion 230$a$ is inflated. In other words, the airbag 20 according to the fifth modified example has functions of the airbag for the chest and the airbag for the waist. As illustrated in FIG. 10, a first introduction hole 204 and a second introduction hole 205 are formed in the case 210 of the airbag 20 according to the fifth modified example. The first introduction hole 204 is an opening for introducing gas for inflating the first inflating portion 230$a$ to the inside of the case 210. The second introduction hole 205 is an opening for introducing gas for inflating the second inflating portion 230$b$ to the inside of the case 210.

In addition, in the flow tube X1 according to the fifth modified example, a first supply hole h3 that supplies gas to the first inflating portion 230$a$ by communicating with the first introduction hole 204 and a second supply hole h4 that supplies gas to the second inflating portion 230$b$ by communicating with the second introduction hole 205 are formed. Here, the second supply hole h4 is formed at a part below the first supply hole h3, that is, a part located upstream, along the flow of gas, of the first supply hole h3 in the flow tube X1.

According to such an airbag device 100E, when the gas generated by the gas generator 30 flows through the flow tube X1, the outflow of gas from the second supply hole h4 is started earlier than the outflow of gas from the first supply hole h3. Thus, the supply of gas to the second inflating portion 230$b$ is started earlier than the supply of gas to the first inflating portion 230$a$. As a result, according to the airbag device 100E of the fifth modified example, the second inflating portion 230b can be inflated earlier than the first inflating portion 230a. In a case where the airbag device 100E according to the fifth modified example is operated, the second inflating portion 230b is inflated first, thereby restraining the waist of the occupant. The first inflating portion 230a is then inflated, thereby restraining the chest of the occupant. According to the airbag device 100E of the fifth modified example, by restraining the waist and the chest in the body of the occupant in this order, the shake of the body of the occupant can be suitably suppressed at the time of vehicle collision, and the occupant can be more suitably protected. Note that, the size of the second supply hole h4 may be greater than that of the first supply hole h3 to preferentially inflate the second inflating portion 230b over the first inflating portion 230a. As a result, a large amount of gas is supplied to the second inflating portion 230b in a short period of time compared to the first inflating portion 230a, and the second inflating portion 230b is preferentially inflated.

Sixth Modified Example

Figure 12:
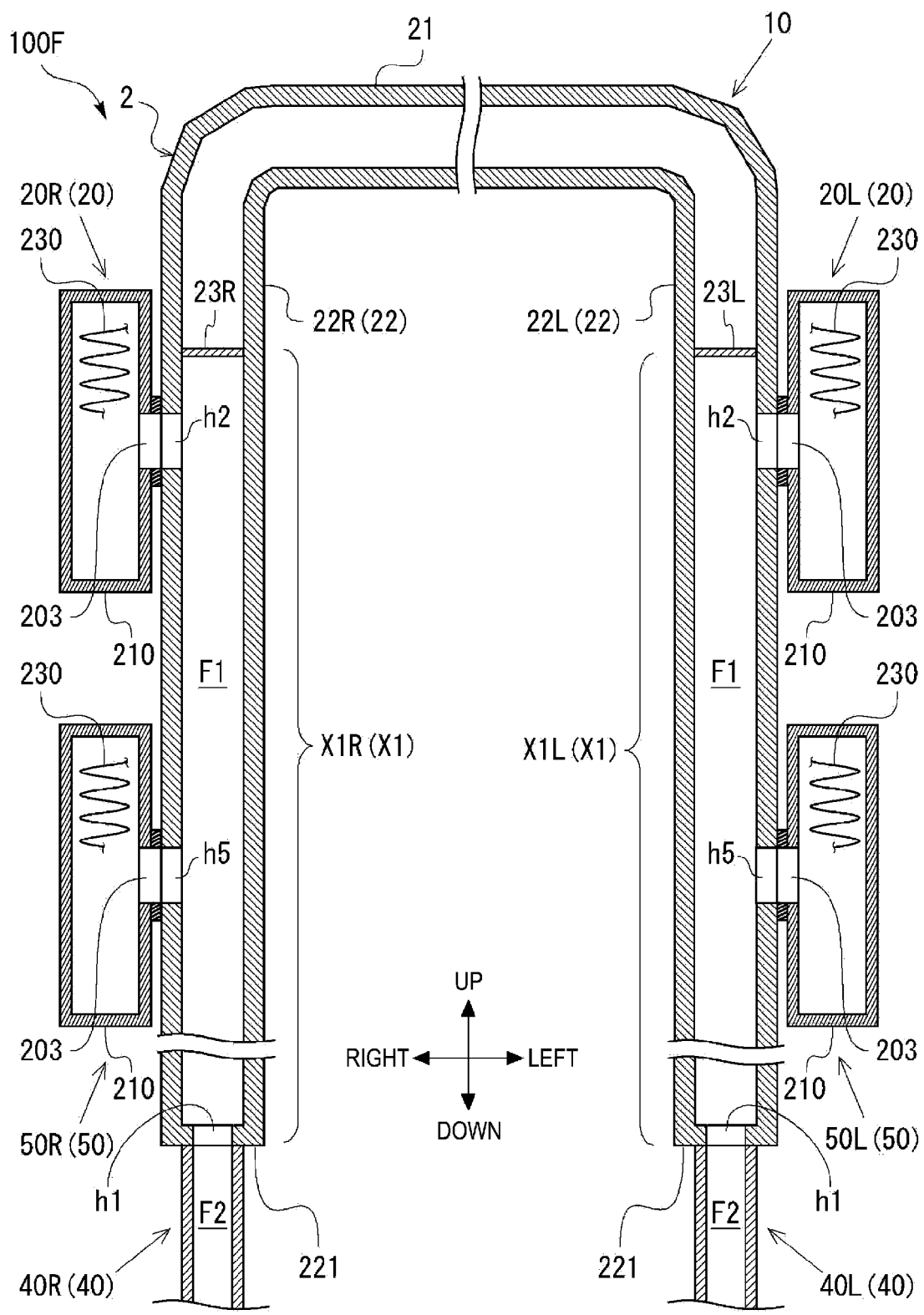
FIG. 12 is a schematic configuration diagram for describing a flow tube according to a sixth modified example of the first embodiment.

FIG. 12 is a schematic configuration diagram for describing a flow tube according to a sixth modified example of the first embodiment. As illustrated in FIG. 12, an airbag device 100F according to a sixth modified example includes a third airbag 50R and a fourth airbag 50L for the waist for protecting the waist of the occupant by being deployed by the supply of gas, in addition to the first airbag 20R and the second airbag 20L serving as airbags for the chest. As illustrated in FIG. 12, the third airbag 50R for the waist is attached to the first back side frame 22R of the back frame 2 in the seat frame 10, and the fourth airbag 50L for the waist is attached to the second back side frame 22L of the back frame 2 in the seat frame 10. Hereinafter, when the third airbag 50R for the waist and the fourth airbag 50L for the waist are described without distinction, they are simply referred to as the airbag 50 for the waist. The airbag 50 for the waist has a structure similar to that of the airbag 20 for the chest, and the attachment position of the airbag 50 to the seat frame 10 is different from that of the airbag 20 for the chest. More specifically, the airbag 50 for the waist is attached to a position below the airbag 20 for the chest in the flow tube X1 formed by a portion of the back side frame 22 of the back frame 2. Thus, the airbag 50 for the waist is inflated at a position below the position where the airbag 20 for the chest is inflated.

Here, as illustrated in FIG. 12, a supply hole h5 for the waist that communicates with the introduction hole 203 of the airbag 50 for the waist is formed at a position corresponding to the introduction hole 203 of the airbag 50 for the waist at a part where the airbag 50 for the waist is attached in the flow tube X1. As a result, the flow tube X1 and the airbag 50 for the waist are connected and thus the gas flowing in the flow tube X1 is supplied to the airbag 50 for the waist through the supply hole h5 for the waist and the introduction hole 203 of the airbag 50 for the waist. The supply hole h5 for the waist is formed at a position above the inflow hole h1 into which the gas flowing from the conduit 40 flows and below the supply hole h2 for the chest from which the gas flows to the airbag 20 for the chest, in the flow tube X1. In other words, in the flow tube X1, the part where the airbag 50 for the waist is connected is located upstream, along the flow of gas, of the part where the airbag 20 for the chest is connected.

According to such an airbag device 100F, when the gas generated by the gas generator 30 flows through the flow tube X1, the outflow of gas from the supply hole h5 for the waist is started earlier than the outflow of gas from the supply hole h2 for the chest. Thus, the supply of gas to the airbag 50 for the waist is started earlier than the supply of gas to the airbag 20 for the chest. As a result, according to the airbag device 100F of the sixth modified example, the airbag 50 for the waist can be deployed earlier than the airbag 20 for the chest. When the airbag device 100F according to the sixth modified example is operated, the airbag 50 for the waist is deployed first, thereby restraining the waist of the occupant. The torso airbag 20 for the chest is then deployed to restrain the chest of the occupant. According to the airbag device 100F of the sixth modified example, similarly to the airbag device 100E according to the fifth modified example, by restraining the waist and the chest in the body of the occupant in this order, the shake of the body of the occupant can be suitably suppressed at the time of vehicle collision, and the occupant can be more suitably protected. In addition, in the airbag device 100F, the airbag 20 for the chest and the airbag 50 for the waist are separately provided. In other words, since the protection of the chest and the protection of the waist are achieved by separate airbags, it is sufficient that an airbag be installed at each of the position corresponding to the chest of the occupant and the position corresponding to the waist. Therefore, the airbag can be miniaturized, and the required amount of gas is reduced. As a result, the entire airbag device can be miniaturized. Note that the size of the supply hole h5 for the waist may be greater than the supply hole h2 for the chest to preferentially inflate the airbag 50 for the waist over the airbag 20 for the chest. Thus, a large amount of gas is supplied to the airbag 50 for the waist in a short period of time compared to the airbag 20 for the chest, and the airbag 50 for the waist is preferentially inflated.

Second Embodiment

Figure 13:
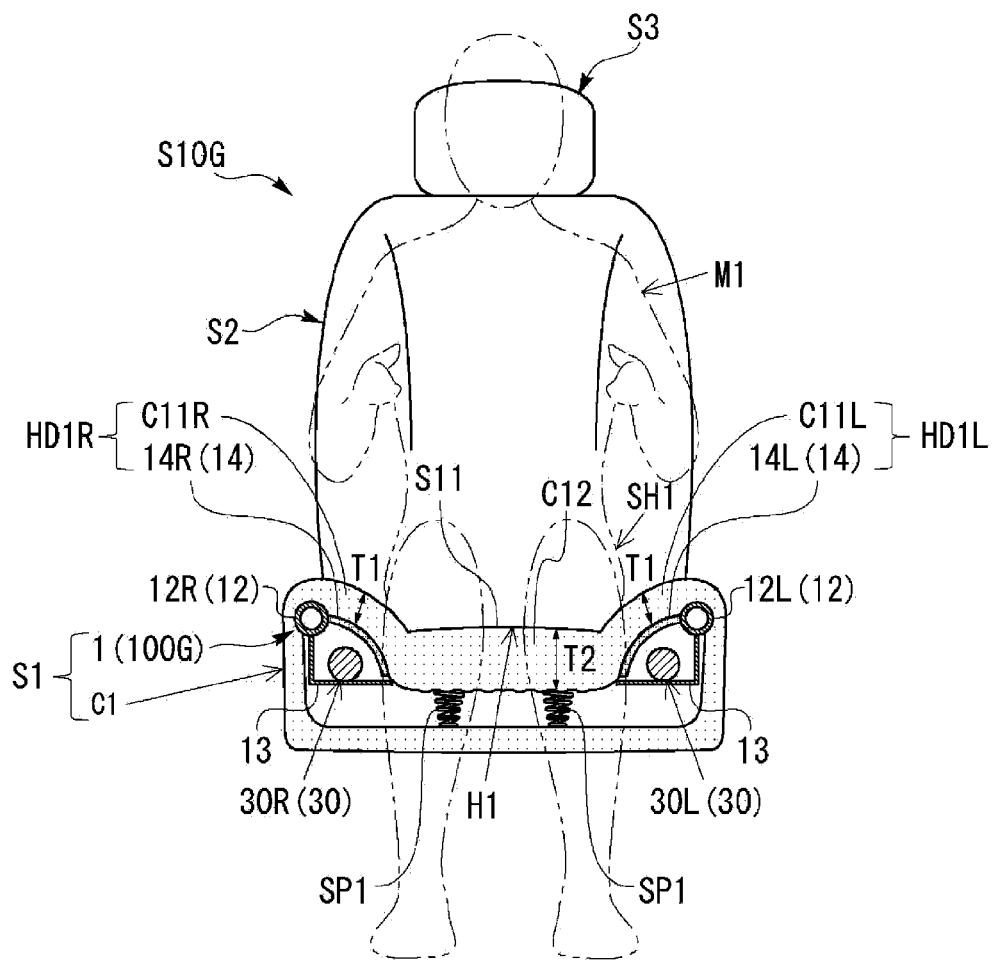
FIG. 13 is a schematic configuration diagram of a vehicle seat equipped with an airbag device according to a second embodiment.
Figure 14:
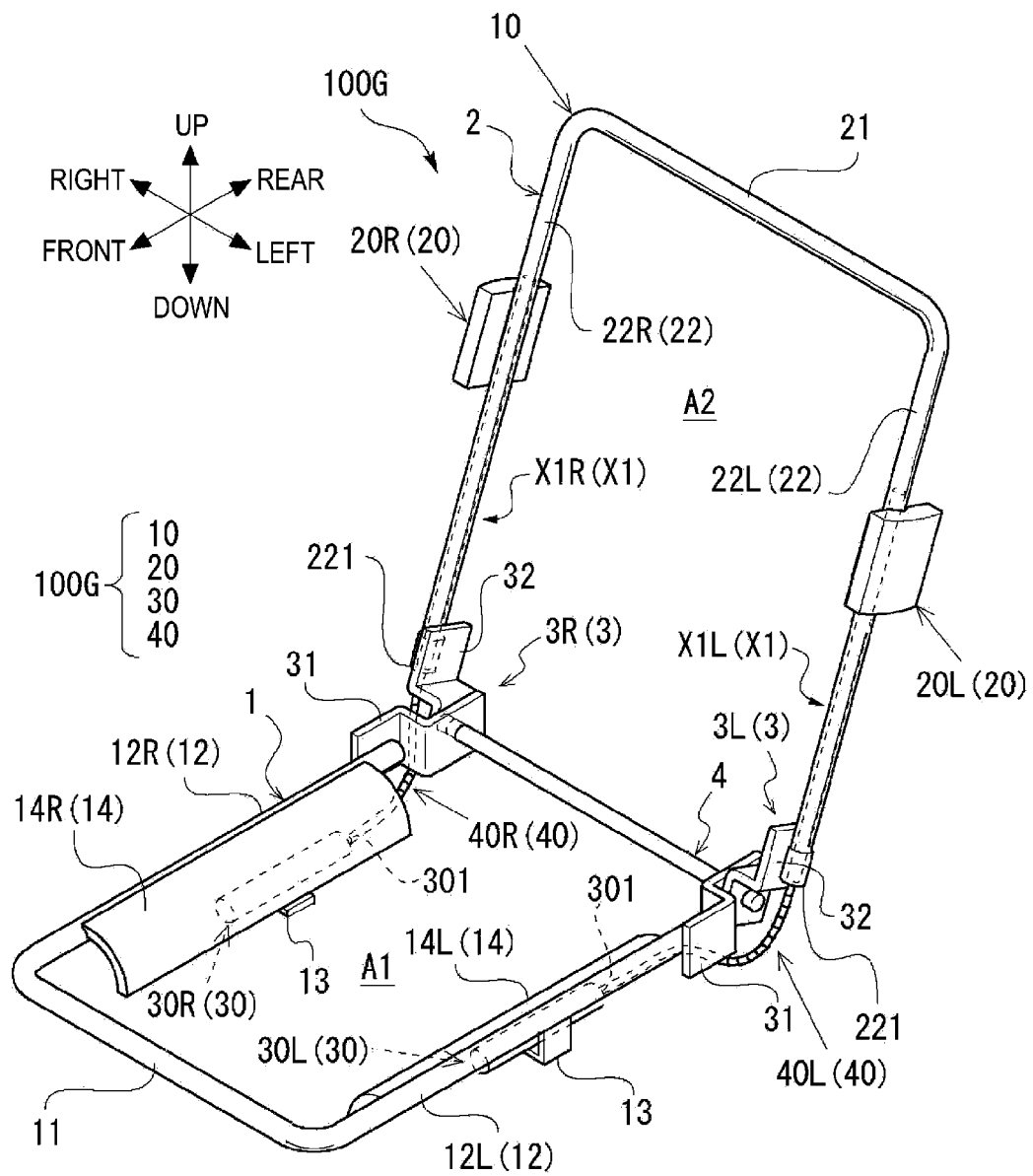
FIG. 14 is a perspective view of the airbag device according to the second embodiment.

The second embodiment describes a vehicle seat provided with an airbag device. FIG. 13 is a schematic configuration diagram of a vehicle seat S10G provided with an airbag device according to a second embodiment. In FIG. 13, a cross-section orthogonal to the front-rear direction (the depth direction) is illustrated. In FIG. 13, a two-dot chain line indicated by reference sign M1 represents an occupant. FIG. 14 is a perspective view of an airbag device 100G according to the second embodiment. Hereinafter, in the description of the second embodiment, the differences from the vehicle seat S10 and the airbag device 100 according to the first embodiment described in FIGS. 1 to 5 are mainly described, and detailed description on the parts similar to those of the vehicle seat S10 and the airbag device 100 will be omitted.

As illustrated in FIG. 14, in the airbag device 100G according to the second embodiment, the gas generator 30 is attached along the cushion side frame 12 of the cushion frame 1 in the seat frame 10. More specifically, the first gas generator 30R and the second gas generator 30L are disposed in the first region A1, and the longitudinal direction (axial direction) thereof is provided that coincides with the direction in which the cushion side frame 12 extends (i.e., the front-rear direction of the vehicle seat S10G). Furthermore, as illustrated in FIG. 13, the cushion frame 1 of the airbag device 100G is provided with a first cover portion 14R that covers the first gas generator 30R from the seating surface S11 side of the seat cushion S1 and a second cover portion 14L that covers the second gas generator 30L from the seating surface S11 side of the seat cushion S1. Hereinafter, when the first cover portion 14R and the second cover portion 14L are described without distinction, they are simply referred to as a cover portion 14. The cover portion 14 is formed of a metal material and extends in the front-rear direction (the depth direction) with an arc-shaped cross-section that is generally convex toward the upper side (the seating surface S11 side). The side edge of the cover portion 14 is connected to the cushion side frame 12 of the cushion frame 1 by welding or the like.

As illustrated in FIG. 13, in the vehicle seat S10G, the cushion C1 is attached to the cushion frame 1 of the airbag device 100G, and the cushion frame 1 is covered by the cushion C1, thus forming the seat cushion S1. At this time, in the vehicle seat S10G, since the gas generator 30 is covered from the seating surface S11 side by the cover portion 14, the gas generator 30 is protected from the load due to the seating of the occupant. Furthermore, since the gas generator 30 is attached along the cushion side frame 12, the first gas generator 30R, the second gas generator 30L, the first cover portion 14R, and the second cover portion 14L are also located on the side of the buttocks H1 of the occupant M1 seated in the vehicle seat S10G, similarly to the cushion side frame 12. More specifically, the buttocks H1 of the occupant M1 are located between the first gas generator 30R and the first cover portion 14R, and the second gas generator 30L and the second cover portion 14L. At this time, the cushion C1 of the vehicle seat S10G is divided, in the left-right direction (the width direction), into a first side portion C11R, which is a region that covers the first cover portion 14R, a second side portion C11L, which is a region spaced apart from the first side portion CUR and covering the second cover portion 14L, and a seating portion C12, which is a region sandwiched between the first side portion C11R and the second side portion C11L. The cushion C1 is a region that supports the buttocks H1 of the occupant M1, and is supported by the spring SP1 from below. Additionally, in the vehicle seat S10G, a first holding portion HD1R is formed by the first cover portion 14R being covered by the first side portion C11R, and a second holding portion HD1L is formed by the second cover portion 14L being covered by the second side portion C11L. The first cover portion 14R and the second cover portion 14L are located at positions sandwiching the buttocks H1 of the occupant M1 in the left-right direction of the vehicle seat S10G, and thus, the first holding portion HD1R and the second holding portion HD1L are formed holding the side buttocks SH1 of the occupant from both sides in the left-right direction.

According to the airbag device 100G of the second embodiment, the same effects as those of the airbag device 100 according to the first embodiment can be obtained. Specifically, as illustrated in FIGS. 13 and 14, the seat back S2 can be thinned by disposing the gas generator 30 in the seat cushion S1 of the vehicle seat S10G. In addition, since a portion of the back frame 2 in the seat frame 10 is formed as the flow tube X1, gas is quickly supplied to the airbag 20, and the airbag 20 can be rapidly deployed. Furthermore, the material cost can be reduced and the weight of the seat itself can be reduced. Furthermore, the seat back S2 can be made thinner by utilizing a portion of the back frame 2 for forming the skeleton of the seat back S2 as the flow tube X1.

Furthermore, according to the vehicle seat S10G of the second embodiment, the holding properties of the vehicle seat S10G can be enhanced by forming the first holding portion HD1R and the second holding portion HD1L that hold the side buttocks SH1 of the occupant M1 from both sides in the left-right direction (width direction) of the vehicle seat S10G.

Here, in the cushion C1, the thickness T1 of the first side portion C11R and the second side portion C11L is set to be smaller, in dimension, than the thickness T2 of the seating portion C12. Thus, it is possible to make the first holding portion HD1R and the second holding portion HD1L firm by making the first side portion C11R and the second side portion C11L relatively thin, while applying appropriate flexibility and elasticity to the seating portion C12 by making the seating portion C12 relatively thick. As a result, the side buttocks SH1 of the occupant M1 can be held more firmly, and the holding properties of the vehicle seat S10G can be further enhanced.

Furthermore, in the vehicle seat S10G, the first gas generator 30R and the second gas generator 30L are attached extending in the direction in which the cushion side frame 12 extends (i.e., the front-rear direction of the vehicle seat S10G), together with the first cover portion 14R and the second cover portion 14L. As a result, the first holding portion HD1R and the second holding portion HD1L can be elongated in the front-rear direction (the depth direction). Therefore, the range held by the first holding portion HD1R and the second holding portion HD1L in the side buttocks SH1 of the occupant M1 can be widened. As a result, the holding properties of the vehicle seat S10G can be further enhanced.

Suitable embodiments of the present disclosure have been described above, but each aspect disclosed in the present specification can be combined with any other features disclosed in the present specification.

REFERENCE SIGNS LIST

1 Cushion frame
14R First cover portion
14L Second cover portion
2 Back frame
4 Reclining rod (rotating shaft portion)
10 Seat frame
20 Airbag (airbag for chest)
30 Gas generator
40 Conduit
50 Airbag for waist
100 Airbag device
S1 Seat cushion (seating surface portion)
S11 Seating surface
S2 Seat back (backrest portion)
S3 Headrest
C1 Cushion
S10 Vehicle seat
X1 Flow tube
HD1R First holding portion
HD1L Second holding portion

The invention claimed is:

1. An airbag device, comprising:
a seat frame that forms a skeleton of a vehicle seat on which an occupant of a vehicle sits;
an airbag that is disposed on a backrest portion that supports a back of the occupant in the vehicle seat and that is deployed by supply of gas; and
a gas generator that is disposed at a seating surface portion that supports buttocks of the occupant in the vehicle seat and that generates gas to be supplied to the airbag;
wherein a part that is a portion of the seat frame and includes at least a portion of a back frame forming a skeleton of the backrest portion, is formed as a flow tube that connects to the airbag to supply gas generated by the gas generator to the airbag, wherein the back frame includes a pair of side frames disposed on right side and left side thereof respectively, the airbag is connected to the gas generator through a flow path including one of the pair of side frames, the flow path extending from the gas generator to the airbag without branching to other flow path connected to the other one of the pair of side frames.

2. The airbag device according to claim 1, further comprising a conduit that guides the gas from the gas generator to the flow tube, wherein the conduit is connected to a part closer to the seating surface portion than a part where the airbag is connected in the flow tube.

3. The airbag device according to claim 1, further comprising a conduit that guides the gas from the gas generator to the flow tube; wherein the seat frame includes a rotating shaft portion that forms a rotating shaft of the back frame for reclining the backrest portion, a part that is a portion of the seat frame and includes at least a portion of the back frame and at least a portion of the rotating shaft portion, is formed as the flow tube, and the conduit is connected to at least a portion of the rotating shaft portion in the flow tube.

4. The airbag device according to claim 2, wherein a cross-sectional area of a flow path of the gas in the flow tube is set greater than a cross-sectional area of the flow path in the conduit.

5. The airbag device according to claim 1, wherein the airbag includes a first inflating portion that protects the chest of the occupant by being inflated by the supply of gas, and a second inflating portion that protects a waist of the occupant by being inflated by the supply of the gas; and in the flow tube, a second supply port that supplies the gas to the second inflating portion is formed at a part upstream, along the flow of the gas, of a first supply port that supplies the gas to the first inflating portion.

6. The airbag device according to claim 1, wherein the airbag is a torso airbag that protects a chest of the occupant by being deployed by the supply of gas, the airbag device further includes a pelvis airbag that protects a waist of the occupant by being deployed by the supply of gas, the flow tube is connected to the pelvis airbag to supply gas generated by the gas generator to the pelvis airbag, in addition to the torso airbag, and in the flow tube, a part where the pelvis airbag is connected is located upstream, along the flow of gas, of a part where the torso airbag is connected.

7. A vehicle seat provided with the airbag device described in claim 1, wherein the gas generator is a first gas generator, the airbag device further includes a second gas generator disposed at the seating surface portion spaced apart in a width direction of the vehicle seat from the first gas generator, the first gas generator and the second gas generator are disposed in a region surrounded by a cushion frame that forms a skeleton of the seating surface portion of the seat frame and attached along a side frame disposed on a side of the buttocks of the occupant of the cushion frame, the cushion frame is provided with a first cover portion that covers the first gas generator from a seating surface side of the seating surface portion and a second cover portion that covers the second gas generator from the seating surface side, and the seating surface portion is formed with a holding portion that holds the side buttocks of the occupant from both sides in a width direction of the vehicle seat with the cushion, attached to the cushion frame, covering the first cover portion and the second cover portion.

8. The vehicle seat according to claim 7, wherein the side frame extends in a depth direction of the vehicle seat at the side of the buttocks of the occupant, and the first gas generator and the second gas generator have a cylindrical shape having a longer dimension in an axial direction than a dimension in a radial direction, and are attached extending in a direction in which the side frame extends, together with the first cover portion and the second cover portion.

9. The airbag device according to claim 3, wherein a cross-sectional area of a flow path of the gas in the flow tube is set greater than a cross-sectional area of the flow path in the conduit.

10. The airbag device according to claim 2, wherein the airbag includes a first inflating portion that protects the chest of the occupant by being inflated by the supply of gas, and a second inflating portion that protects a waist of the occupant by being inflated by the supply of the gas; and in the flow tube, a second supply port that supplies the gas to the second inflating portion is formed at a part upstream, along the flow of the gas, of a first supply port that supplies the gas to the first inflating portion.

11. The airbag device according to claim 3, wherein the airbag includes a first inflating portion that protects the chest of the occupant by being inflated by the supply of gas, and a second inflating portion that protects a waist of the occupant by being inflated by the supply of the gas; and in the flow tube, a second supply port that supplies the gas to the second inflating portion is formed at a part upstream, along the flow of the gas, of a first supply port that supplies the gas to the first inflating portion.

12. The airbag device according to claim 4, wherein the airbag includes a first inflating portion that protects the chest of the occupant by being inflated by the supply of gas, and a second inflating portion that protects a waist of the occupant by being inflated by the supply of the gas; and in the flow tube, a second supply port that supplies the gas to the second inflating portion is formed at a part upstream, along the flow of the gas, of a first supply port that supplies the gas to the first inflating portion.

13. The airbag device according to claim 2, wherein the airbag is a torso airbag that protects a chest of the occupant by being deployed by the supply of gas, the airbag device further includes a pelvis airbag that protects a waist of the occupant by being deployed by the supply of gas, the flow tube is connected to the pelvis airbag to supply gas generated by the gas generator to the pelvis airbag, in addition to the torso airbag, and in the flow tube, a part where the pelvis airbag is connected is located upstream, along the flow of gas, of a part where the torso airbag is connected.

14. The airbag device according to claim 3, wherein
the airbag is a torso airbag that protects a chest of the occupant by being deployed by the supply of gas,
the airbag device further includes a pelvis airbag that protects a waist of the occupant by being deployed by the supply of gas,
the flow tube is connected to the pelvis airbag to supply gas generated by the gas generator to the pelvis airbag, in addition to the torso airbag, and
in the flow tube, a part where the pelvis airbag is connected is located upstream, along the flow of gas, of a part where the torso airbag is connected.

15. The airbag device according to claim 4, wherein
the airbag is a torso airbag that protects a chest of the occupant by being deployed by the supply of gas,
the airbag device further includes a pelvis airbag that protects a waist of the occupant by being deployed by the supply of gas,
the flow tube is connected to the pelvis airbag to supply gas generated by the gas generator to the pelvis airbag, in addition to the torso airbag, and
in the flow tube, a part where the pelvis airbag is connected is located upstream, along the flow of gas, of a part where the torso airbag is connected.

16. A vehicle seat provided with the airbag device described in claim 2, wherein
the gas generator is a first gas generator,
the airbag device further includes a second gas generator disposed at the seating surface portion spaced apart in a width direction of the vehicle seat from the first gas generator,
the first gas generator and the second gas generator are disposed in a region surrounded by a cushion frame that forms a skeleton of the seating surface portion of the seat frame and attached along a side frame disposed on a side of the buttocks of the occupant of the cushion frame,
the cushion frame is provided with a first cover portion that covers the first gas generator from a seating surface side of the seating surface portion and a second cover portion that covers the second gas generator from the seating surface side, and
the seating surface portion is formed with a holding portion that holds the side buttocks of the occupant from both sides in a width direction of the vehicle seat with the cushion, attached to the cushion frame, covering the first cover portion and the second cover portion.

17. A vehicle seat provided with the airbag device described in claim 3, wherein
the gas generator is a first gas generator,
the airbag device further includes a second gas generator disposed at the seating surface portion spaced apart in a width direction of the vehicle seat from the first gas generator,
the first gas generator and the second gas generator are disposed in a region surrounded by a cushion frame that forms a skeleton of the seating surface portion of the seat frame and attached along a side frame disposed on a side of the buttocks of the occupant of the cushion frame,
the cushion frame is provided with a first cover portion that covers the first gas generator from a seating surface side of the seating surface portion and a second cover portion that covers the second gas generator from the seating surface side, and
the seating surface portion is formed with a holding portion that holds the side buttocks of the occupant from both sides in a width direction of the vehicle seat with the cushion, attached to the cushion frame, covering the first cover portion and the second cover portion.

18. A vehicle seat provided with the airbag device described in claim 4, wherein
the gas generator is a first gas generator,
the airbag device further includes a second gas generator disposed at the seating surface portion spaced apart in a width direction of the vehicle seat from the first gas generator,
the first gas generator and the second gas generator are disposed in a region surrounded by a cushion frame that forms a skeleton of the seating surface portion of the seat frame and attached along a side frame disposed on a side of the buttocks of the occupant of the cushion frame,
the cushion frame is provided with a first cover portion that covers the first gas generator from a seating surface side of the seating surface portion and a second cover portion that covers the second gas generator from the seating surface side, and
the seating surface portion is formed with a holding portion that holds the side buttocks of the occupant from both sides in a width direction of the vehicle seat with the cushion, attached to the cushion frame, covering the first cover portion and the second cover portion.

19. The vehicle seat according to claim 16, wherein
the side frame extends in a depth direction of the vehicle seat at the side of the buttocks of the occupant, and
the first gas generator and the second gas generator have a cylindrical shape having a longer dimension in an axial direction than a dimension in a radial direction, and are attached extending in a direction in which the side frame extends, together with the first cover portion and the second cover portion.

20. The vehicle seat according to claim 17, wherein
the side frame extends in a depth direction of the vehicle seat at the side of the buttocks of the occupant, and
the first gas generator and the second gas generator have a cylindrical shape having a longer dimension in an axial direction than a dimension in a radial direction, and are attached extending in a direction in which the side frame extends, together with the first cover portion and the second cover portion.

21. An airbag device, comprising:
a seat frame that forms a skeleton of a vehicle seat on which an occupant of a vehicle sits;
an airbag that is disposed on a backrest portion that supports a back of the occupant in the vehicle seat and that is deployed by supply of gas;
a gas generator that is disposed at a seating surface portion that supports buttocks of the occupant in the vehicle seat and that generates gas to be supplied to the airbag; wherein a part that is a portion of the seat frame and includes at least a portion of a back frame forming a skeleton of the backrest portion, is formed as a flow tube that connects to the airbag to supply gas generated by the gas generator to the airbag; and
a conduit that guides the gas from the gas generator to the flow tube; wherein
the seat frame includes a rotating shaft portion that forms a rotating shaft of the back frame for reclining the backrest portion, a part that is a portion of the seat frame and includes at least a portion of the back frame and at least a portion of the rotating shaft portion, is formed as the flow tube, and the conduit is connected to at least a portion of the rotating shaft portion in the flow tube.

22. An airbag device, comprising:

a seat frame that forms a skeleton of a vehicle seat on which an occupant of a vehicle sits;

an airbag that is disposed on a backrest portion that supports a back of the occupant in the vehicle seat and that is deployed by supply of gas; and a gas generator that is disposed at a seating surface portion that supports buttocks of the occupant in the vehicle seat and that generates gas to be supplied to the airbag; wherein a part that is a portion of the seat frame and includes at least a portion of a back frame forming a skeleton of the backrest portion, is formed as a flow tube that connects to the airbag to supply gas generated by the gas generator to the airbag, wherein the gas generator is a first gas generator, the airbag device further includes a second gas generator disposed at the seating surface portion spaced apart in a width direction of the vehicle seat from the first gas generator, the first gas generator and the second gas generator are disposed in a region surrounded by a cushion frame that forms a skeleton of the seating surface portion of the seat frame and attached along a side frame disposed on a side of the buttocks of the occupant of the cushion frame, the cushion frame is provided with a first cover portion that covers the first gas generator from a seating surface side of the seating surface portion and a second cover portion that covers the second gas generator from the seating surface side, and the seating surface portion is formed with a holding portion that holds the side buttocks of the occupant from both sides in a width direction of the vehicle seat with the cushion, attached to the cushion frame, covering the first cover portion and the second cover portion.

* * * * *